US012786187B2

(12) United States Patent
Oe et al.

(10) Patent No.: US 12,786,187 B2
(45) Date of Patent: Nov. 3, 2026

(54) SYSTEM, SERVER APPARATUS, CONTROL METHOD OF SERVER APPARATUS, AND STORAGE MEDIUM

(71) Applicant: NEC Corporation, Tokyo (JP)

(72) Inventors: Takeyoshi Oe, Tokyo (JP); Haruka Sato, Tokyo (JP); Tomohiro Yamaguchi, Tokyo (JP); Toshiro Morita, Tokyo (JP); Mami Yamaguchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 85 days.

(21) Appl. No.: 18/723,952

(22) PCT Filed: Jan. 17, 2022

(86) PCT No.: PCT/JP2022/001304

§ 371 (c)(1),
(2) Date: Jun. 25, 2024

(87) PCT Pub. No.: WO2023/135784

PCT Pub. Date: Jul. 20, 2023

(65) Prior Publication Data

US 2025/0080529 A1 Mar. 6, 2025

(51) Int. Cl.
*H04L 9/40* (2022.01)

(52) U.S. Cl.
CPC ................................ *H04L 63/0861* (2013.01)

(58) Field of Classification Search
None
See application file for complete search history.

(56) References Cited

U.S. PATENT DOCUMENTS 11,494,782 B1 * 11/2022 Jacoby ................. G06Q 20/351
2006/0031158 A1 * 2/2006 Orman ................... G06Q 30/02
705/38

(Continued)

FOREIGN PATENT DOCUMENTS

CN 110543957 * 7/2019
CN 110543957 A * 12/2019 ............ G06Q 10/02

(Continued)

OTHER PUBLICATIONS

English translation of Written opinion for PCT Application No. PCT/JP2022/001304, mailed on Mar. 29, 2022.

(Continued)

*Primary Examiner* — Piotr Poltorak

(57) ABSTRACT

A system includes a server apparatus and an authentication terminal. The server apparatus stores biometric information of at least one or more users who plan to use a hotel. The authentication terminal is managed by an affiliated business operator that has a partnership relationship with the hotel and transmits an authentication request that includes biometric information of a person to be authenticated to the server apparatus. The server apparatus identifies the person to be authenticated among the at least one or more users by a matching processing using the biometric information included in the authentication request and the stored biometric information. When the identified person to be authenticated is a hotel user who uses or has used the hotel within a predetermined period of time based on a time of processing the authentication request, the server apparatus provides the hotel user with a reward related to the affiliated business operator.

19 Claims, 20 Drawing Sheets

(56) References Cited

U.S. PATENT DOCUMENTS

| | | | | |
|---|---|---|---|---|
| 2010/0106579 | A1* | 4/2010 | Etheredge | G06Q 30/02<br>705/14.25 |
| 2015/0170183 | A1* | 6/2015 | Santaella | G06Q 30/0226<br>705/14.27 |
| 2019/0325452 | A1 | 10/2019 | Farjami | |

FOREIGN PATENT DOCUMENTS

| | | | | |
|---|---|---|---|---|
| JP | 2002-366672 | A | 12/2002 | |
| JP | 2010-277360 | A | 12/2010 | |
| JP | 2016-045949 | A | 4/2016 | |
| JP | 2017-068370 | A | 4/2017 | |
| JP | 2017-224050 | A | 12/2017 | |
| JP | 2018-067201 | A | 4/2018 | |
| JP | 2020-003873 | A | 1/2020 | |
| JP | 2020-194316 | A | 12/2020 | |
| JP | 2021-018523 | A | 2/2021 | |
| JP | 2021-026639 | A | 2/2021 | |
| JP | 2021-068371 | A | 4/2021 | |
| JP | 2021-099656 | A | 7/2021 | |
| WO | 2022/003766 | A1 | 1/2022 | |
| WO | WO-2022119768 | A1 * | 6/2022 | H04L 9/50 |

OTHER PUBLICATIONS

JP Office Action for JP Application No. 2022-150594, mailed on Aug. 5, 2025 with English Translation.

International Search Report for PCT Application No. PCT/JP2022/001304, mailed on Mar. 29, 2022.

Notice of Reasons for Refusal of JP patent application No. 2022-538766 mailed on Aug. 2, 2022.

Yukiko Watanabe, “A close look at the cashless strategies of various companies: Which economic zone will benefit from them?”, Nikkei Trendy, Nikkei BP, Mar. 4, 2021, No. 476, pp. 56-59 and English translation of the part circled in red on p. 59 thereof.

* cited by examiner

USER INFORMATION DATABASE

| USER ID | BIOMETRIC INFORMATION | PERSONAL INFORMATION | | | RESERVATION INFORMATION | | ... |
|---|---|---|---|---|---|---|---|
| | | NAME | ADDRESS | ... | PERIOD OF STAY | ... | |
| ID01 | FV01 | NM01 | ADD01 | ... | 2021/12/1 - 12/3 | ... | ... |
| ID02 | FV02 | NM02 | ADD02 | ... | 2021/12/1 - 12/4 | ... | ... |
| ID03 | FV03 | NM03 | ADD03 | ... | 2021/12/2 - 12/4 | ... | ... |
| ID04 | FV04 | NM04 | ADD04 | ... | 2021/12/5 - 12/10 | ... | ... |
| ID05 | FV05 | NM05 | ADD05 | ... | 2021/12/6 - 12/12 | ... | ... |
| ID06 | FV06 | NM06 | ADD06 | ... | 2021/12/7 - 12/15 | ... | ... |
| ⋮ | ⋮ | ⋮ | ⋮ | ⋮ | ⋮ | ⋮ | ⋮ |

FIG.7

| TERMINAL FUNCTION ID | CONTENTS OF REWARD |
|---|---|
| TF01 | DISCOUNT ON PRICE |
| TF02 | DELIVERY SERVICE |
| TF03 | USE OF RESORT FACILITY |
| TF04 | PRIORITY USE OF PARKING LOT |
| TF05 | TAXI PICK-UP |
| ⋮ | ⋮ |

FIG.9

SYSTEM, SERVER APPARATUS, CONTROL METHOD OF SERVER APPARATUS, AND STORAGE MEDIUM

This application is a National Stage Entry of PCT/JP2022/001304 filed on Jan. 17, 2022, the contents of all of which are incorporated herein by reference, in their entirety.

TECHNICAL FIELD

The present invention relates to a system, a server apparatus, a control method of the server apparatus, and a storage medium.

BACKGROUND ART

In recent years, services using biometric authentication (face recognition) have begun to be provided.

For example, Patent Literature 1 describes that a system that provides a service in a simple and convenient manner is provided. The system for providing a service of Patent Literature 1 includes a face image acquisition means, a storage means, a face matching means, and an output means. The face image acquisition means acquires a face image of a target person. The storage means stores face images for authentication of registered persons and information about the registered persons. The face matching means matches the face image and the face images for authentication. The output means outputs information related to the service. Furthermore, when the face matching means determines that the target person is a registered person, the output means outputs information about the registered person as service-related information.

Furthermore, Patent Literature 2 describes that a check-in of a user to an accommodation facility and use of services are properly managed. An accommodation facility management system of Patent Literature 2 includes a first acquisition means, an execution means, a second acquisition means, and a permission means. The first acquisition means acquires a face image of a visiting user who uses a check-in terminal installed at a position visible from a reception counter of the accommodation facility. The execution means identifies the visiting user based on the face image of the visiting user and executes a check-in process for the visiting user. The second acquisition means acquires a face image of a specified user who uses the service. The permission means permits the use of the service when the check-in process of the specified user identified based on the face image of the specified user has been completed.

CITATION LIST

Patent Literature

[PTL 1] Japanese Unexamined Patent Application Publication No. JP2017-224050

[PTL 1] Japanese Unexamined Patent Application Publication No. JP2021-068371

SUMMARY OF INVENTION

Technical Problem

There exists a unique economic sphere formed by hotels, restaurants, retail stores, and the like in tourist areas and so on. In such areas, many residents work in hotels, and so on, and there is a need to revitalize the areas where hotels, restaurants, and the like operate.

In this regard, the above needs cannot be met even if the techniques disclosed in Patent Literature 1 and Patent Literature 2 are applied. This is because Patent Literature 1 and Patent Literature 2 only disclose that a user is identified by biometric authentication and that a service is provided to the identified user.

It is a main object of the present invention to provide a system, a server apparatus, a control method of the server apparatus, and a storage medium, which contribute to revitalizing an economy of an area including a hotel.

Solution to Problem

According to a first aspect of the present invention, there is provided a system including: a server apparatus that stores biometric information of at least one or more users who plan to use a hotel; and an authentication terminal that is managed by an affiliated business operator that has a partnership relationship with the hotel, and transmits an authentication request including biometric information of a person to be authenticated to the server apparatus, wherein the server apparatus identifies the person to be authenticated among the at least one or more users by a matching processing using the biometric information included in the authentication request and the stored biometric information, and provides a hotel user with a reward related to the affiliated business operator when the identified person to be authenticated is the hotel user who will use the hotel after a predetermined time based on a time of processing the authentication request or who used the hotel before a predetermined time based on the time of processing the authentication request.

According to a second aspect of the present invention, there is provided a server apparatus including: a storage unit that stores biometric information of at least one or more users who plan to use a hotel; a receiving unit that receives an authentication request including biometric information of a person to be authenticated from an authentication terminal that is managed by an affiliated business operator that has a partnership relationship with the hotel; and an authentication unit that identifies the person to be authenticated among the at least one or more users by a matching processing using the biometric information included in the authentication request and the stored biometric information, and provides a hotel user with a reward related to the affiliated business operator when the identified person to be authenticated is the hotel user who will use the hotel after a predetermined time based on the time of processing the authentication request or who used the hotel before a predetermined time based on the time of processing the authentication request.

According to a third aspect of the present invention, there is provided a control method of a server apparatus that stores biometric information of at least one or more users who plan to use a hotel, the control method including: receiving an authentication request including biometric information of a person to be authenticated from an authentication terminal that is managed by an affiliated business operator that has a partnership relationship with the hotel; identifying the person to be authenticated among the at least one or more users by a matching processing using the biometric information included in the authentication request and the stored biometric information; and providing a hotel user with a reward related to the affiliated business operator when the identified person to be authenticated is the hotel user who will use the hotel after a predetermined time based on the time of processing the authentication request or who used the hotel before a predetermined time based on the time of processing the authentication request.

According to a fourth aspect of the present invention, there is provided a computer-readable storage medium storing a program causing a computer mounted on a server apparatus that stores biometric information of at least one or more users who plan to use a hotel to perform processing for: receiving an authentication request including biometric information of a person to be authenticated from an authentication terminal that is managed by an affiliated business operator that has a partnership relationship with the hotel; identifying the person to be authenticated among the at least one or more users by a matching processing using the biometric information included in the authentication request and the stored biometric information; and providing a hotel user with a reward related to the affiliated business operator when the identified person to be authenticated is the hotel user who will use the hotel after a predetermined time based on the time of processing the authentication request or who used the hotel before a predetermined time based on the time of processing the authentication request.

Advantageous Effects of Invention

According to the individual aspects of the present invention, a system, a server apparatus, a control method of the server apparatus, and a storage medium are provided that contribute to revitalizing an economy of an area that includes a hotel. The advantageous effects of the present invention are not limited to the above advantageous effect. The present invention may provide other advantageous effects, instead of or in addition to the above advantageous effect.

BRIEF DESCRIPTION OF THE DRAWINGS

FIG. 7 illustrates a diagram illustrating an example of a user information database according to the first example embodiment.

FIG. 9 is a diagram illustrating an example of table information according to the first example embodiment.

EXAMPLE EMBODIMENT

Figure 1:
FIG. 1 is a diagram illustrating an outline of an example embodiment.

First, an outline of an example embodiment will be described. In the following outline, various components are denoted by reference characters for the sake of convenience. That is, the following reference characters are used as examples to facilitate the understanding of the present invention. Thus, the description of the outline is not intended to impose any limitations. In addition, unless otherwise specified, an individual block illustrated in the drawings represents a configuration of a functional unit, not a hardware unit. An individual connection line between blocks in the drawings signifies both one-way and two-way directions. An arrow schematically illustrates a principal signal (data) flow and does not exclude bidirectionality. In the present description and drawings, elements that can be described in a like way will be denoted by a like reference character, and redundant description thereof will be omitted as needed.

Figure 2:
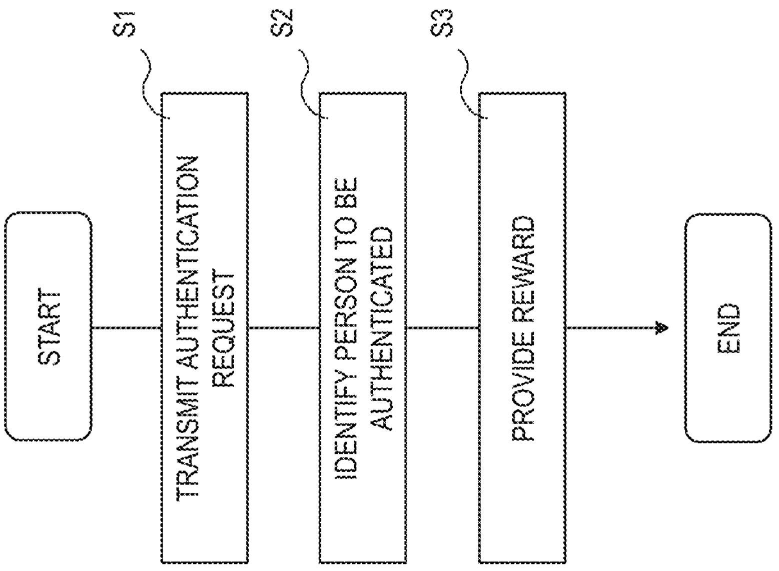
FIG. 2 is a flowchart illustrating an example of an operation of a system according to an example embodiment.

The system according to an example embodiment includes a server apparatus 101 and an authentication terminal 102 (see FIG. 1). The server apparatus 101 stores biometric information of at least one or more users who plan to use a hotel. The authentication terminal 102 is managed by an affiliated business operator that has a partnership relationship with the hotel and transmits an authentication request that includes biometric information of a person to be authenticated to the server apparatus 101 (step S1 in FIG. 2). The server apparatus 101 identifies the person to be authenticated among the at least one or more users by a matching processing using the biometric information included in the authentication request and the stored biometric information (step S2). When the identified person to be authenticated is a hotel user who uses or has used the hotel within a predetermined period of time based on a time of processing the authentication request, the server apparatus 101 provides the hotel user with a reward related to the affiliated business operator (step S3).

In the above system, when a hotel user who uses a hotel visits an affiliated business operator operating in the vicinity of the hotel and purchases a product or receives a service, a reward is provided to the hotel user. By providing the hotel user with the reward, the hotel user (tourist) is motivated to use the hotel and to engage in consumption behavior at the affiliated business operator in the vicinity. In other words, attractiveness of the hotel and the affiliated business operator in the vicinity of the hotel will increase, and more users (tourists) will use the hotel and the affiliated business operator. As a result, the economy of the hotel and the area around the hotel will be revitalized.

Hereinafter, specific example embodiments will be described in more detail with reference to drawings.

First Example Embodiment

A first example embodiment will be described in more detail with reference to drawings.

[System Configuration]

Figure 3:
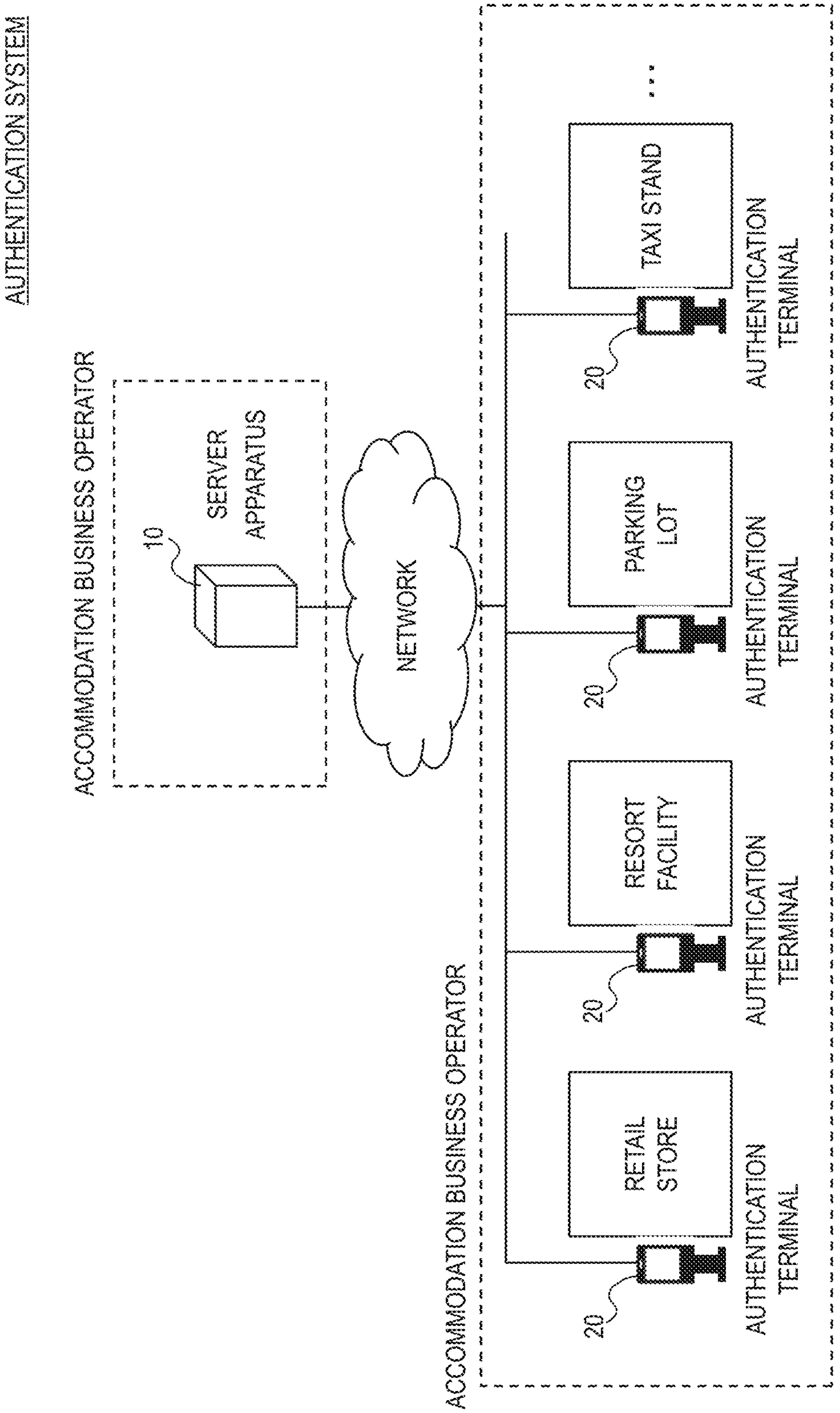
FIG. 3 is a diagram illustrating an example of a schematic configuration of an authentication system according to a first example embodiment.

FIG. 3 is a diagram illustrating an example of a schematic configuration of an authentication system (information processing system) according to a first example embodiment. As shown in FIG. 3, the authentication system includes an accommodation business operator that manages a hotel, or the like, and an affiliated business operator that has a partnership relationship with the accommodation business operator.

Examples of affiliated business operators that have partnership relationships with the accommodation business operator include a restaurant, retail store, parking lot management company, resort facility (ski resort, golf course), taxi company, and so on. Alternatively, one corporate group may operate a hotel, shopping mall (a restaurant, retail store, or the like), parking lot, and the like. Even in this case, the hotel and restaurant, and so on, are in a partnership relationship.

The accommodation business operator is equipped with a server apparatus 10. The server apparatus 10 may be installed at a head office of the accommodation business operator or at the hotel, or the server apparatus 10 may be installed on a network (on a cloud). The server apparatus 10 stores biometric information of at least one or more users who plan to use the hotel.

Note that examples of the biometric information include data (feature values) calculated from physical features unique to an individual, such as a face, a fingerprint, a voiceprint, a vein, a retina, or an iris pattern of an eye. Alternatively, the biometric information may be image data such as a face image, a fingerprint image, and so on.

The biometric information may be anything that includes physical characteristics of a user as information. In the present application, a case in which biometric information about a "face" of a person (a face image or a feature value generated from the face image) is used will be described.

Authentication terminals 20 are installed in facilities around the hotel (affiliated business operators). Each authentication terminal 20 is connected to the server apparatus 10 via a network. Specifically, the server apparatus 10 and the authentication terminals 20 are connected by wired or wireless communication means and are configured to be able to communicate with each other.

The authentication terminal 20 is managed by the affiliated business operator that has a partnership relationship with the hotel, and transmits an authentication request that includes biometric information (for example, a face image) of a person to be authenticated (a user who has visited the affiliated business operator) to the server apparatus 10.

The configuration of the authentication system shown in FIG. 3 is an example and is not intended to limit the configuration of the authentication system. For example, the authentication system may include a plurality of the server apparatuses 10. Moreover, the number of the affiliated business operators included in the authentication system is not intended to be limited to "4". The authentication system may include at least one or more affiliated business operators.

[Schematic Operation]

The following is a schematic operation of the authentication system according to the first example embodiment.

<Reservation for Use of Hotel>

Figure 4:
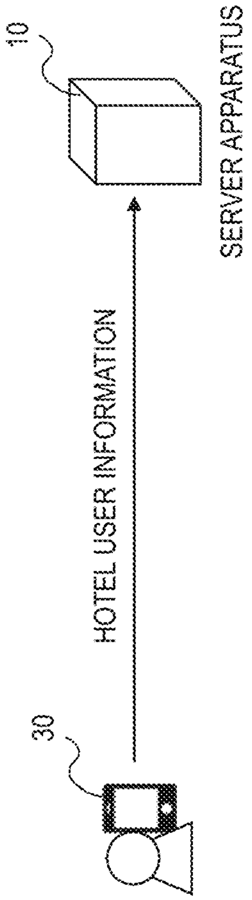
FIG. 4 is a diagram illustrating an operation of the authentication system according to the first example embodiment.

A user who wishes to use a hotel (for example, to stay overnight, to eat at a restaurant, and so on) makes a reservation in advance. The user operates a terminal 30 in his or her possession to register hotel user information (information about the user using the hotel) in the server apparatus 10 (see FIG. 4).

The hotel user information includes personal information of the user (name, address, and so on), biometric information (face image), reservation information, and so on. The reservation information about a user who plans to stay at the hotel includes a period of stay, grade of room, dinner menu, and so on. The reservation information about a user who will use a facility in the hotel (restaurant, wedding hall, and so on) includes a date of use of the facility (reservation date), name of the facility (for example, name of the restaurant), and details of a service (for example, a meal menu), and so on.

Note that in the following description, a user who will use a hotel after a predetermined time based on the time of processing an authentication request, or a user who used a hotel before a predetermined time based on the time of processing the authentication request, will be described as a "hotel user".

For example, the hotel user includes a user who has made a reservation for a stay at a hotel, and who is in a period of the stay including a start date of the stay (check-in date) and an end date of the stay (check-out date). In other words, a user who has made a reservation for a stay at a hotel, but has not yet checked in, is determined to be the hotel user on the day of check-in. Similarly, a user who has checked out is determined to be the hotel user on the day of check-out.

Alternatively, a user who has made a reservation to use a facility in a hotel (for example, a restaurant) is determined to be the hotel user on the day the user uses the facility. In this way, an example of the hotel user is a hotel guest or a user of a hotel facility.

<Reward for Hotel User>

Various rewards related to business operators that have a partnership relationship with the hotel will be provided to the hotel user. An example of specific rewards provided to the hotel user will be described below.

<Discount on Price>

When the hotel user engages in a consumption behavior (purchasing a product or receiving a service) at a restaurant or retail store affiliated with a hotel, a reward is provided to the user. For example, when the hotel user makes a purchase at a retail store affiliated with the hotel, the price paid by the hotel user is discounted.

In this case, the user pays for the purchased product using the authentication terminal 20 installed at the retail store affiliated with the hotel. At that time, the authentication terminal 20 acquires biometric information of the user (for example, a face image). The authentication terminal 20 transmits an authentication request that includes the acquired biometric information to the server apparatus 10.

The server apparatus 10 performs a matching processing using the biometric information of the user. When the matching processing is successful (when the biometric information of a person to be authenticated is registered), the server apparatus 10 determines whether the identified user by the matching processing is the hotel user or not.

Specifically, the server apparatus 10 determines that the user is the hotel user in case a processing date of the authentication request is during a hotel stay period or on a hotel use day.

The server apparatus 10 determines that the authentication is successful when the matching processing is successful and when the person to be authenticated is the hotel user. The server apparatus 10 determines that the authentication failed when the matching processing fails or when the person to be authenticated is not the hotel user.

When the biometric authentication is successful, the server apparatus 10 gives the person to be authenticated (the hotel user) a reward related to a discount on a price of a product. For example, the server apparatus 10 notifies the authentication terminal 20 of a predetermined discount rate.

The authentication terminal 20 settles a payment by applying the notified discount rate.

<Delivery Service>

A reward may be provided to the hotel user related to a delivery service. For example, when the hotel user purchases a product, and so on, at a retail store that has a partnership relationship with the hotel, a reward related to delivery of the product is provided.

For example, when the user desires delivery of a purchased product, the authentication terminal 20 acquires biometric information of the user. The authentication terminal 20 transmits an authentication request that includes the acquired biometric information to the server apparatus 10.

The server apparatus 10 performs biometric authentication (matching processing, determining processing regarding the hotel user) using biometric information previously registered by the user and the biometric information acquired from the authentication terminal 20.

When the biometric authentication is successful, the server apparatus 10 notifies the authentication terminal 20 that the person to be authenticated is the hotel user and a home address and an accommodation address (address and room number of the hotel where the hotel user is staying) of the person to be authenticated (hotel user).

When the hotel user desires delivery of the purchased product, the authentication terminal 20 acquires a delivery destination desired by the user (for example, delivery to his or her home or delivery to the hotel).

The authentication terminal 20 creates a slip for shipping the product using the address of the delivery destination desired by the user (the address notified by the server apparatus 10). The authentication terminal 20 prints the above created slip. A clerk at the retail store attaches the printed slip to the product and hands the product over to a shipping company, or the like. That is, since the user has already registered his or her address in the server apparatus 10 in order to check in, the server apparatus 10 can identify the user by biometric authentication and identify not only the accommodation (hotel room number) of the identified user but also the home address of the identified user.

<Use of Resort Facility>

A reward related to using resort facilities may be provided to the hotel user. For example, when a user visits a resort such as a ski resort or golf course that has a partnership relationship with the hotel, a reward related to using the facility at the resort may be provided to the user.

When the hotel user who has visited the resort that has a partnership relationship with the hotel uses facilities (equipment) such as a lift, gondola, cart, or the like, the hotel user moves in front of the authentication terminal 20 installed in close proximity to the lift or the like.

The authentication terminal 20 acquires biometric information of the user. The authentication terminal 20 transmits an authentication request that includes the acquired biometric information to the server apparatus 10.

The server apparatus 10 performs biometric authentication (matching processing, determining processing regarding the hotel user) using biometric information previously registered by the user and the biometric information acquired from the authentication terminal 20.

When the biometric authentication is successful (in case the person to be authenticated is the hotel user), the server apparatus 10 notifies the authentication terminal 20 that the person is permitted to use the resort facility. When the biometric authentication fails (in case the person to be authenticated is not the hotel user), the server apparatus 10 notifies the authentication terminal 20 that the person is not permitted to use the resort facility.

The authentication terminal 20 permits or rejects the person to be authenticated to use the resort facility that has a partnership relationship with the hotel, in accordance with a notification from the server apparatus 10.

<Priority Use of Parking Lot>

A reward related to priority use of a parking lot may be provided to the hotel user.

When a vehicle arrives at a parking lot that has a partnership relationship with the hotel, the authentication terminal 20 acquires biometric information of a user driving the vehicle. The authentication terminal 20 transmits an authentication request that includes the acquired biometric information of the user to the server apparatus 10.

The server apparatus 10 performs biometric authentication (matching processing, determining processing regarding the hotel user) using biometric information previously registered by the user and the biometric information acquired from the authentication terminal 20.

When the biometric authentication is successful (in case the person to be authenticated is the hotel user), the server apparatus 10 notifies the authentication terminal 20 that the driver (the person to be authenticated) is the hotel user. When the biometric authentication fails (in case the person to be authenticated is not the hotel user), the server apparatus 10 notifies the authentication terminal 20 that the driver is not the hotel user.

Here, a parking space is secured for the hotel user in the parking lot that has a partnership relationship with the hotel. When there is no vacant parking space for a general user other than the hotel user in the parking lot, and in case the user is the hotel user, the authentication terminal 20 permits the hotel user to use the parking space secured for the hotel user.

<Taxi Pick-Up>

A reward related to taxi pick-up may be provided to the hotel user. For example, the authentication terminal 20 is installed at a taxi stand at a train station nearest to a hotel or at an airport.

A user moves in front of the authentication terminal 20 installed at the taxi stand. The authentication terminal 20 acquires biometric information of the user. The authentication terminal 20 transmits an authentication request that includes the acquired biometric information of the user to the server apparatus 10.

The server apparatus 10 performs biometric authentication (matching processing, determining processing regarding the hotel user) using biometric information previously registered by the user and the biometric information acquired from the authentication terminal 20.

When the biometric authentication is successful (in case the person to be authenticated is the hotel user), the server apparatus 10 notifies the authentication terminal 20 that the user (the person to be authenticated) is the hotel user. When the biometric authentication fails (in case the person to be authenticated is not the hotel user), the server apparatus 10 notifies the authentication terminal 20 that the user (the person to be authenticated) is not the hotel user.

When the person to be authenticated is the hotel user, the authentication terminal 20 inquires whether the user wishes to go to the hotel or not. When the hotel user wishes to go to the hotel, the authentication terminal 20 sets the destination to the hotel and arranges for a taxi to pick up the user. Specifically, the authentication terminal 20 instructs a taxi company affiliated with the hotel to pick up the user. Note that a reward regarding a taxi fare (free fare or discounted fare) may be provided to the hotel user.

In this way, in the authentication system according to the first example embodiment, the server apparatus 10 identifies a person to be authenticated from among a plurality of users who have made a reservation in advance by matching processing using biometric information included in an authentication request and biometric information stored in advance. When the identified person to be authenticated is determined to be the hotel user, the server apparatus 10 provides a reward related to an affiliated business operator to the hotel user.

At that time, the server apparatus 10 changes the reward provided to the hotel user in accordance with a function of the authentication terminal 20 installed at each affiliated business operator. For example, when processing an authentication request from the authentication terminal 20 installed in a retail store, rewards such as a discount on price or delivery service are provided to the hotel user. Alternatively, when processing an authentication request from the authentication terminal 20 installed in a parking lot, rewards such as priority use of the parking lot are provided to the hotel user.

Next, details of the individual apparatuses included in the authentication system according to the first example embodiment will be described.

[Server Apparatus]

Figure 5:
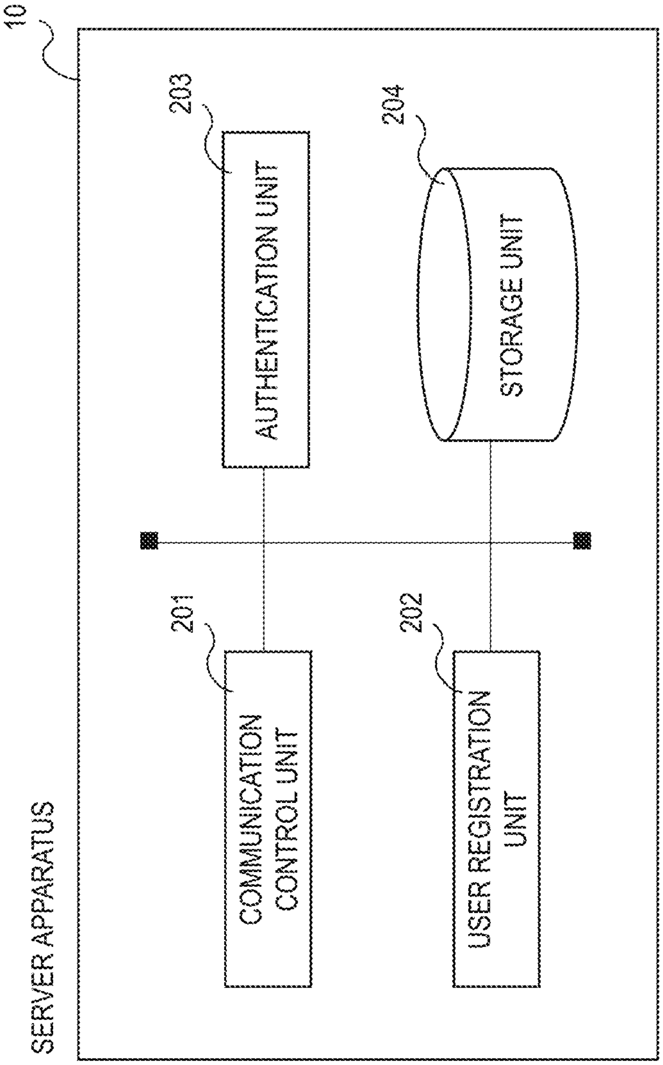
FIG. 5 is a diagram illustrating an example of a processing configuration of a server apparatus according to the first example embodiment.

FIG. 5 is a diagram illustrating an example of a processing configuration (processing modules) of the server apparatus 10 according to the first example embodiment. As illustrated in FIG. 5, the server apparatus 10 includes a communication control unit 201, a user registration unit 202, an authentication unit 203, and a storage unit 204.

The communication control unit 201 is means for controlling communication with other apparatuses. For example, the communication control unit 201 receives data (packets) from the authentication terminal 20. In addition, the communication control unit 201 transmits data to the authentication terminal 20. The communication control unit 201 gives data received from other apparatuses to other processing modules. The communication control unit 201 transmits data acquired from other processing modules to other apparatuses. In this way, other processing modules transmit and receive data to and from other apparatuses via the communication control unit 201. The communication control unit 201 includes a function as a receiving unit that receives data from other apparatuses and a function as a transmitting unit that transmits data to other apparatuses.

The user registration unit 202 is means for registering hotel user information for a user who uses a hotel. The user information registration unit 202 acquires "hotel user information" from the user who plans to use the hotel. For example, the user information registration unit 202 acquires hotel user information from the terminal 30 owned by a user who wishes to use the hotel.

Figure 6:
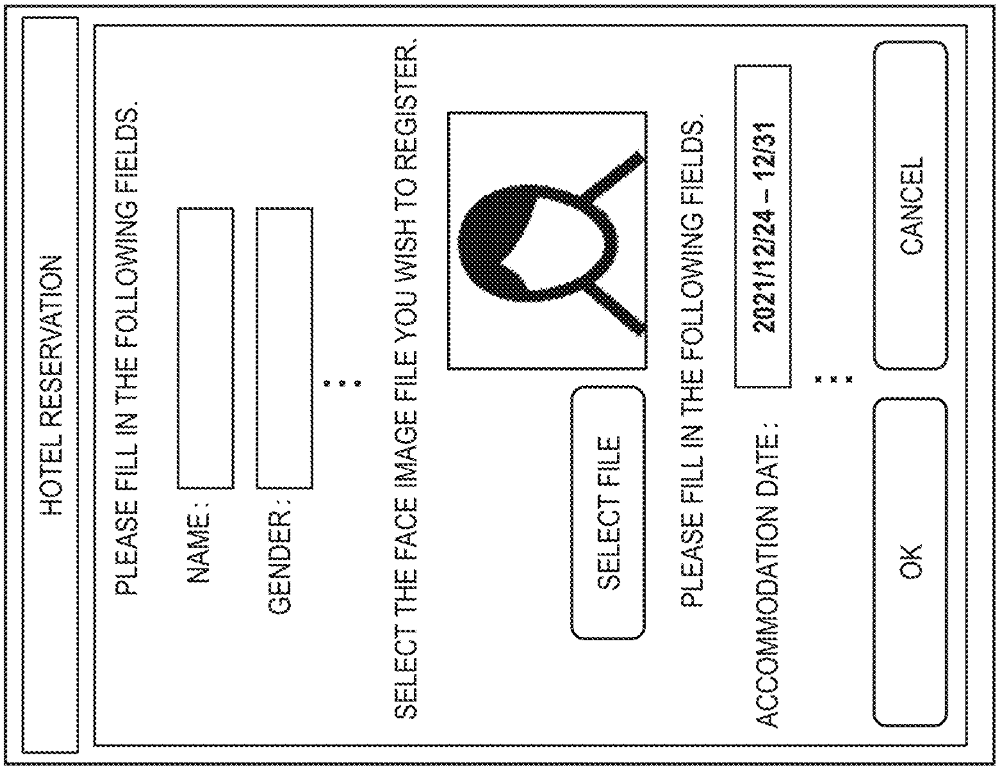
FIG. 6 is a diagram illustrating an example of a display of a terminal according to the first example embodiment.

For example, the user registration unit 202 displays a GUI (Graphical User Interface) or an input form for acquiring hotel user information on the terminal 30 and acquires the hotel user information. For example, the user registration unit 202 displays the GUI as illustrated in FIG. 6 on the terminal 30 when the user makes a reservation for the hotel.

The user registration unit 202 acquires personal information of the user (name, address, gender, date of birth, contact information, account information, and so on), biometric information (for example, face image), reservation information (period of stay, room grade, dinner menu, and so on), and so on as "hotel user information".

When the user information registration unit 202 acquires the hotel user information, the user registration unit 202 generates a user ID to identify the user. The user ID may be any information as long as the user ID uniquely identifies the hotel user (reservation holder, guest). For example, the user registration unit 202 may number a unique value each time the hotel user information is registered and use the value as the user ID.

The user registration unit 202 generates a feature value that characterizes a face image from the face image registered by the user (a feature vector consisting of plurality of feature values). Note that since an existing technology can be used to generate the feature values, a detailed description thereof will be omitted. For example, the user registration unit 202 extracts eyes, nose, mouth, and so on as feature points from the face image. Next, the user registration unit 202 calculates the location of an individual feature point and the distance between feature points as the feature values and generates the feature vector formed by the plurality of feature values (vector information that characterizes the face image).

The user information registration unit 202 registers the generated user ID, biometric information (feature value), personal information, reservation information, and so on in a user information database (see FIG. 7). As shown in FIG. 7, the user information database stores the user ID, biometric information, personal information, and reservation information in association with each other.

The user information database shown in FIG. 7 is an example and is not intended to limit the items to be stored. For example, a face image may be registered in the user information database as biometric information instead of or in addition to the feature value generated from the face image.

Figure 8:
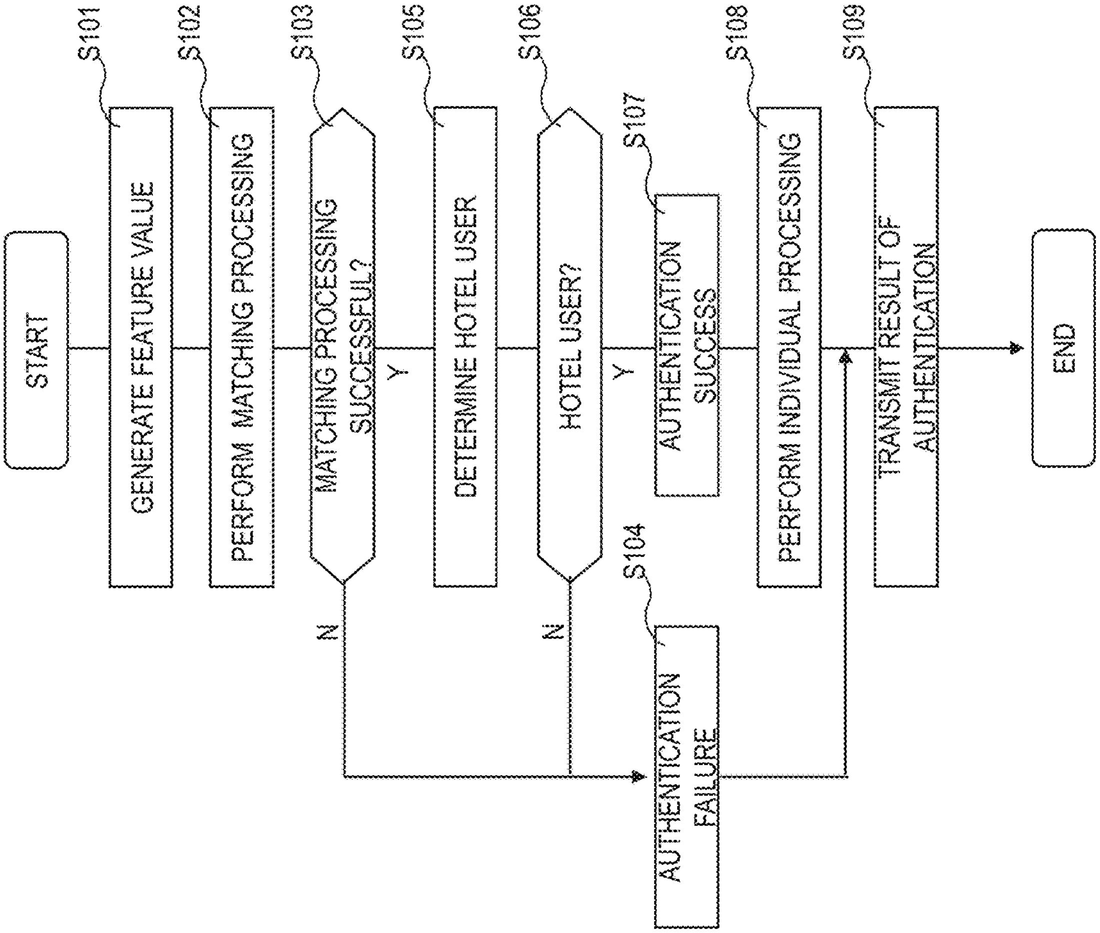
FIG. 8 is a flowchart illustrating an example of an operation of an authentication unit according to the first example embodiment.

The authentication unit 203 is means for performing biometric authentication of a user who has visited an affiliated business operator. The authentication unit 203 processes an authentication request received from the authentication terminal 20 installed at the affiliated business operator. FIG. 8 is a flowchart illustrating an example of an operation of the authentication unit 203 according to the first example embodiment. Referring to FIG. 8, the operation of the authentication unit 203 will be described.

Since the authentication request includes a face image of a person to be authenticated, the authentication unit 203 extracts the face image from the authentication request. The authentication unit 203 generates a feature value from the extracted face image (Step S101).

The authentication unit 203 sets the feature value generated based on the face image acquired from the authentication terminal 20 as a target for matching, and performs matching processing between the feature value and feature value registered in the user information registration database (Step S102). More specifically, the authentication unit 203 sets the above generated feature value (feature vector) as the target for matching and performs 1-to-N matching (N is a positive integer, and the same applies to the following description) between the target for matching and a plurality of feature values that are registered in the user information database.

The authentication unit 203 calculates a similarity between the feature value to be matched and each of the plurality of feature values on the registration side. For the individual similarity, the chi-squared distance, the Euclidean distance, or the like may be used. A longer distance represents a lower similarity, and a shorter distance represents a higher similarity.

The authentication unit 203 determines that the matching processing has been successful when there exists a feature value whose similarity between the feature value among the plurality of feature values registered in the user information database and the feature value of the target to be matched is greater than a predetermined value. When the above feature value does not exist, the authentication unit 203 determines that matching processing has failed.

When the matching processing fails (step S103, No branch), the authentication unit 203 sets "authentication failure" as the result of authentication (step S104).

When the matching processing is successful (step S103, Yes branch), the authentication unit 203 identifies a user with a highest similarity calculated during the matching processing, and determines whether or not the identified user is the hotel user (determining the hotel user; step S105).

For example, the authentication unit 203 checks a period of stay of the identified user (person to be authenticated) and determines whether or not the date of processing the authentication request is included in the period of stay. When the date of processing the authentication request is included in the period of stay, the authentication unit 203 determines that the person to be authenticated is the hotel user. When the date of processing the authentication request is not included in the period of stay, the authentication unit 203 determines that the person to be authenticated is the non-hotel user.

Alternatively, the authentication unit 203 determines that the person to be authenticated is the hotel user when the scheduled date of use of the hotel (date of reservation at a restaurant, and so on) of the person to be authenticated identified by the matching processing matches the date of processing the authentication request.

When the person to be authenticated is not the hotel user (step S106, No branch), the authentication unit 203 sets "authentication failure" as the result of authentication (step S104).

When the person to be authenticated is the hotel user (step S106, Yes branch), the authentication unit 203 sets "authentication success" as the result of authentication (step S107).

Furthermore, when the biometric authentication is successful, the authentication unit 203 performs a processing specific to a sender (affiliated business operator visited by the hotel user) of the authentication request (performing individual processing; step S108).

Here, the authentication request includes a terminal function ID that is set by the authentication terminal 20, which is the sender of the authentication request. The terminal function ID is an ID to identify the function assigned to the authentication terminal 20. More specifically, the terminal function ID is an ID to identify what kind of a reward provided to the hotel user who visits each authentication terminal.

The authentication unit 203 refers to table information that stores in association with each other the terminal function ID and the reward provided to the hotel user who visited the affiliated business operator, and identifies the individual processing to be performed in response to receiving the authentication request (see FIG. 9).

Note that the details of the individual processing for each affiliated business operator will be described along with the operation of the authentication terminal 20.

The authentication unit 203 transmits the result of authentication (authentication success or authentication failure) to the authentication terminal 20 (step S109). Specifically, when the biometric authentication is successful, the authentication unit 203 transmits a positive response indicating that fact to the authentication terminal 20. When the biometric authentication fails, the authentication unit 203 transmits a negative response indicating that fact to the authentication terminal 20.

At that time, the authentication unit 203 may transmit the positive response that includes information (accompanying information) obtained as a result of the individual processing to the authentication terminal 20.

The storage unit 204 is means for storing information necessary for an operation of the server apparatus 10. The user information database is established in the storage unit 204. The storage unit 204 stores biometric information of at least one or more users (reservation holders regarding use of a hotel) and reservation information regarding a hotel reservation.

[Authentication Terminal]

Figure 10:
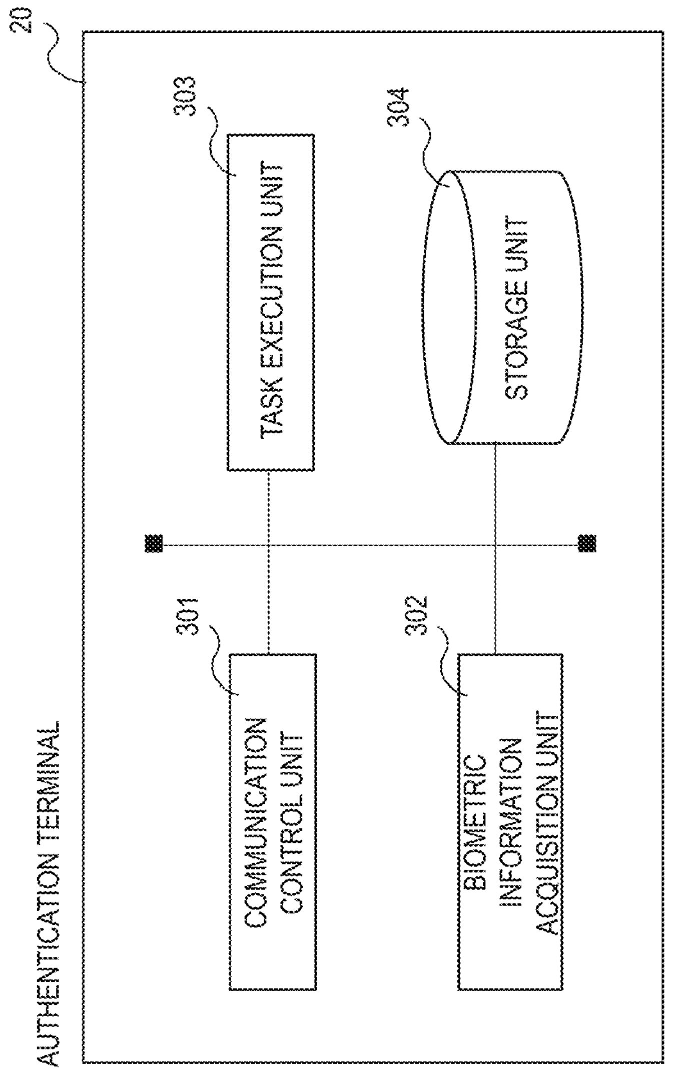
FIG. 10 is a diagram illustrating an example of a processing configuration of an authentication terminal according to the first example embodiment.

FIG. 10 is a diagram illustrating an example of a processing configuration (processing modules) of the authentication terminal 20. Referring to FIG. 10, the authentication terminal 20 includes a communication control unit 301, a biometric information acquisition unit 302, a task execution unit 303, and a storage unit 304.

The communication control unit 301 is means for controlling communication with other apparatuses. For example, the communication control unit 301 receives data (packets) from the server apparatus 10. In addition, the communication control unit 301 transmits data to the server apparatus 10. The communication control unit 301 gives data received from other apparatuses to other processing modules. The communication control unit 301 transmits data acquired from other processing modules to other apparatuses. In this way, other processing modules transmit and receive data to and from other apparatuses via the communication control unit 301. The communication control unit 301 includes a function as a receiving unit that receives data from other apparatuses and a function as a transmitting unit that transmits data to other apparatuses.

The biometric information acquisition unit 302 is means for controlling a camera device (camera device included in the authentication terminal 20) and acquiring biometric information (for example, a face image) of a person to be authenticated. The biometric information acquisition unit 302 takes an image in front of the own apparatus periodically or at predetermined timing. Alternatively, the biometric information acquisition unit 302 takes an image in front of the own apparatus in accordance with an instruction from the task execution unit 303.

The biometric information acquisition unit 302 determines whether or not the acquired image includes a human face image, and when the face image is included in the acquired image, the biometric information acquisition unit 302 extracts the face image from the acquired image data.

An existing technique can be used for the face image detection and extraction processing performed by the biometric information acquisition unit 302, and therefore, detailed description thereof will be omitted. For example, the biometric information acquisition unit 302 may extract a face image (a face area) from the image data by using a learning model learned by a CNN (Convolutional Neural Network). Alternatively, the biometric information acquisition unit 302 may extract a face image by using a technique such as template matching.

The biometric information acquisition unit 302 gives the extracted face image to the task execution unit 303.

The task execution unit 303 is means for executing (realizing) a task assigned to the authentication terminal 20 of each affiliated business operator. Although processing specific to each affiliated business operator will be described later, the task execution unit 303 generally operates as follows.

The task execution unit 303 transmits to the server apparatus 10 an authentication request including biometric information (for example, a face image) of a person to be authenticated and a terminal function ID preset in own apparatus. For example, the authentication terminal 20 installed in a retail store sets "TF01 (discount for payment)" as the terminal function ID.

The task execution unit 303 receives a response (positive response or negative response) to the authentication request from the server apparatus 10. The task execution unit 303 executes predetermined processing based on the response and the accompanying information that includes in the response.

Individual processing for each affiliated business operator will be described later.

The storage unit 304 is means for storing information necessary for an operation of the authentication terminal 20.

[Terminal]

Examples of the terminal 30 include a mobile terminal device such as a smartphone, a mobile phone, a game console, a tablet, and so on. The terminal 30 can be any equipment or device as long as the terminal 30 can accept an operation by a user and can communicate with the server apparatus 10, and so on. Further, since the configuration, and so on, of the terminal 30 is obvious to those skilled in the art, a detailed description will be omitted.

[System Operation]

Next, operations in the authentication system according to the first example embodiment will be described.

<Discount on Price>

Figure 11:
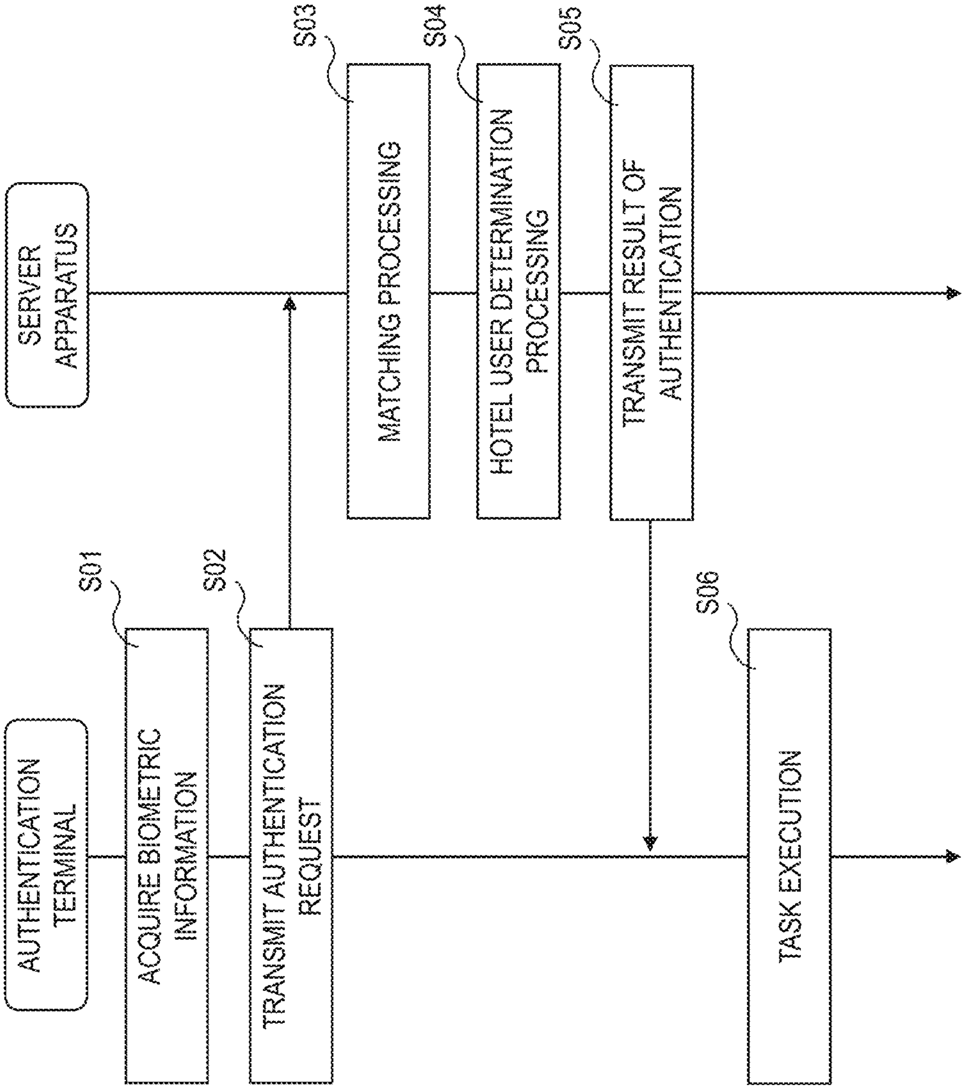
FIG. 11 is a sequence diagram illustrating an example of an operation of the authentication system according to the first example embodiment.

Referring to FIG. 11, operations of the authentication system when a reward related to a "discount on price" is provided to the hotel user will be described. FIG. 11 is a diagram illustrating an example of the operations of the authentication system according to the first example embodiment.

Figure 12:
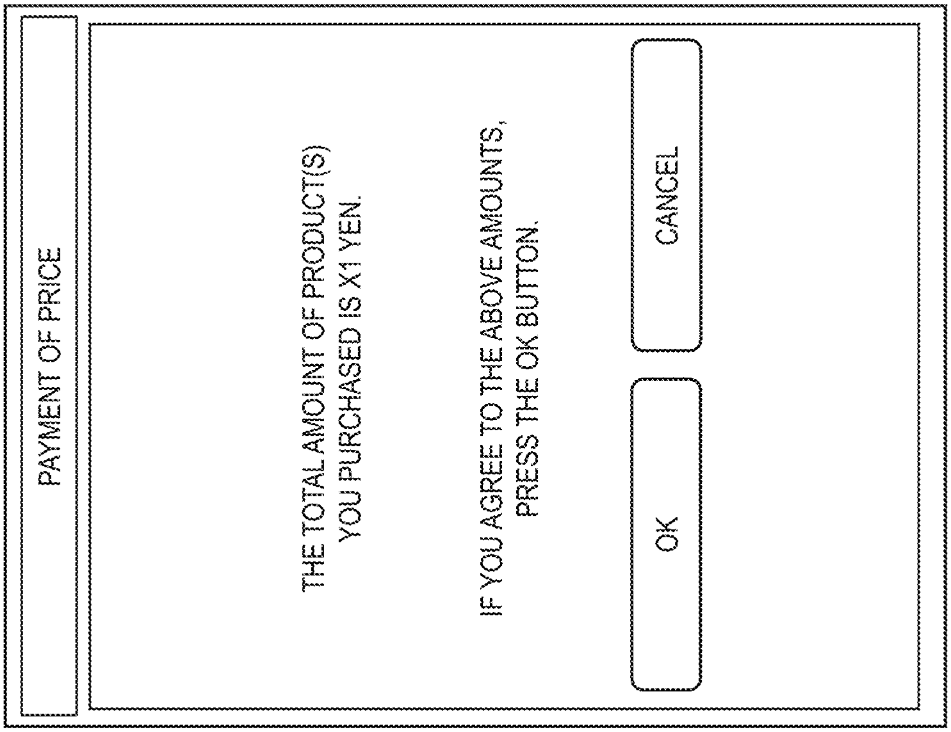
FIG. 12 is a diagram illustrating an example of a display of the authentication terminal according to the first example embodiment.

When a user makes payment for a product, the authentication terminal 20 installed in a retail store, etc. affiliated with the hotel acquires biometric information (face image) of a user (Step S01). For example, the task execution unit 303 of the authentication terminal 20 displays the GUI as shown in FIG. 12 and instructs the biometric information acquisition unit 302 to acquire the biometric information at the timing when the user presses the "OK" button.

The task execution unit 303 transmits an authentication request that includes the acquired biometric information and a terminal function ID to the server apparatus 10 (step S02). Note that the task execution unit 303 sets "discount on price" as the terminal function ID.

The authentication unit 203 of the server apparatus 10 receives the authentication request and performs a matching processing using the biometric information (step S03). When the matching process is successful and a person to be authenticated is identified, the authentication unit 203 performs a determining processing to determine whether or not the person to be authenticated is the hotel user (hotel user determination processing; step S04).

When the matching process or determining processing of the hotel user fails, the authentication unit 203 sets the result of authentication of the biometric authentication to "authentication failure". When the matching process and determining processing of the hotel user are successful, the authentication unit 203 sets the result of authentication of the biometric authentication is "authentication success".

The authentication unit 203 transmits the result of authentication to the authentication terminal 20 (step S05). At that time, when the biometric authentication is successful, the authentication unit 203 transmits a positive response that includes a discount rate applicable to the hotel user to the authentication terminal 20.

The task execution unit 303 of the authentication terminal 20 receives the response to the authentication request (positive response, negative response) and performs a processing in accordance with the result of authentication (task execution; step S06).

When the task execution unit 303 receives a negative response (discounting the price is not possible), the task execution unit 303, for example, displays a GUI that allows the user to select a payment method (for example, cash payment, credit card payment, and so on), and makes the payment using the acquired payment method.

Figure 13:
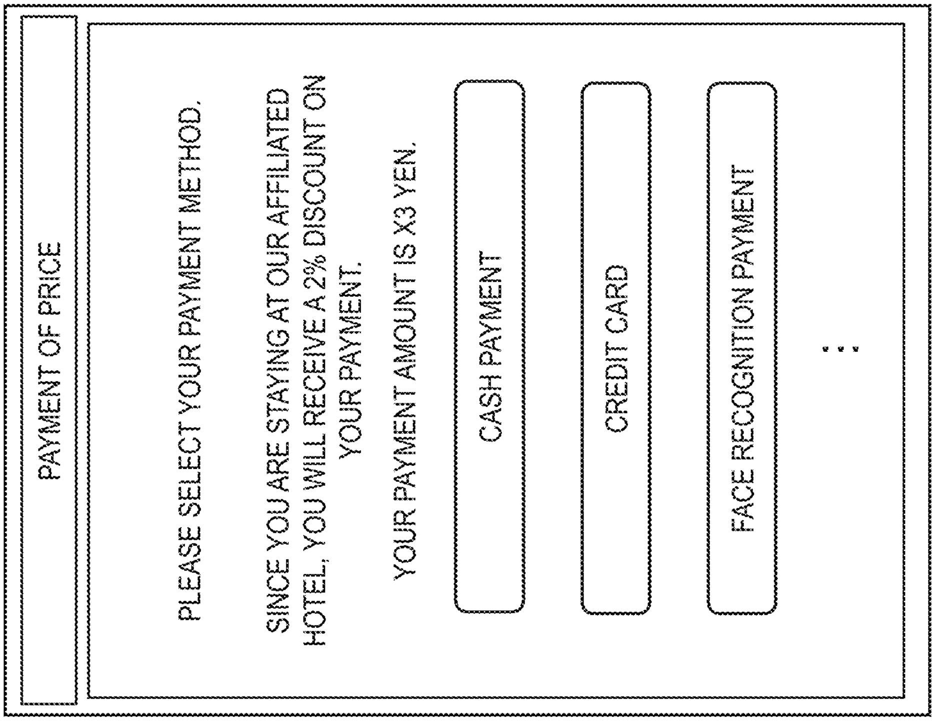
FIG. 13 is a diagram illustrating an example of a display of the authentication terminal according to the first example embodiment.

When the task execution unit 303 receives a positive response (discounting the price is possible), the task execution unit 303 displays the fact that a reward has been provided to the hotel user while displaying a GUI that allows the user to select the payment method (see FIG. 13). The task execution unit 303 applies the discount rate notified by the server apparatus 10 and makes the payment on the price.

Note that when a user selects "face recognition payment", the task execution unit 303 transmits the biometric information and payment information (payment amount) to a payment server (not shown in FIG. 3, and so on) which stores biometric information of a user and account information (bank account and credit card information) in association with each other. Since the face recognition payment is different from the purpose of the present application, a detailed description of the operation of the payment server, and the like, will be omitted.

The authentication unit 203 may determine a reward provided to the hotel user based on reservation information of a person to be authenticated identified by biometric authentication. For example, the authentication unit 203 may determine a discount rate based on the reservation information of the person who has been successfully authenticated (the person to be authenticated whose biometric authentication has been successfully determined). For example, the authentication unit 203 may determine the discount rate in accordance with period of stay and room grade (room rate) of the hotel user. The authentication unit 203 notifies the authentication terminal 20 of the determined discount rate. For example, the authentication unit 203 may provide a larger discount to the hotel user for a longer period of stay. Alternatively, the authentication unit 203 may provide a larger discount for a higher room rate.

In this way, the authentication terminal 20 transmits to the server apparatus 10 an authentication request that includes a terminal function ID for identifying a function assigned to the authentication terminal 20 and biometric information of a person to be authenticated. The server apparatus 10 identifies the function of the authentication terminal 20 based on the terminal function ID, and provides a reward to the hotel user in accordance with the identified function. More specifically, the server apparatus 10 provides the hotel user with a discount on price to be paid by the hotel user to an affiliated business operator as a reward.

<Delivery Service>

The following describes operations of the authentication system when a reward related to "delivery service" is provided to the hotel user. Note that even if the content of a reward provided to the hotel user change, the basic operation of the system remains unchanged, so a drawing corresponding to FIG. 11 will be omitted.

Figure 14:
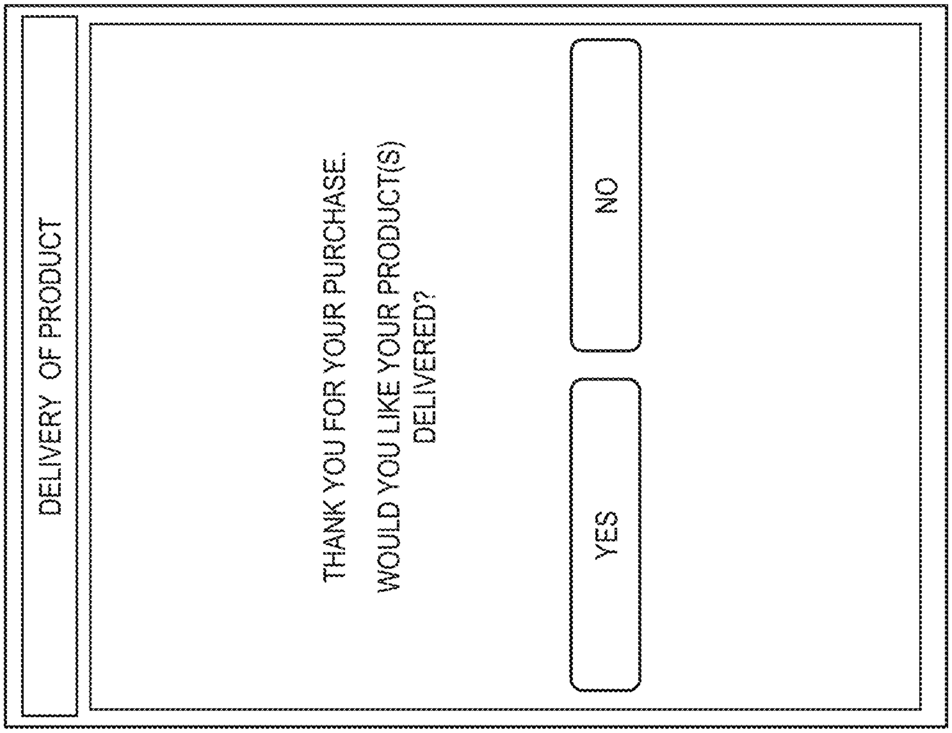
FIG. 14 is a diagram illustrating an example of a display of the authentication terminal according to the first example embodiment.

When the payment for the product is completed, the authentication terminal 20 installed at a retail store or the like affiliated with the hotel confirms whether or not a user wishes to have the product delivered. Specifically, the task execution unit 303 uses the GUI shown in FIG. 14 to acquire a wish related to product delivery of the user.

When the user desires to have the product delivered, the task execution unit 303 of the authentication terminal 20 instructs the biometric information acquisition unit 302 to acquire biometric information.

The task execution unit 303 transmits an authentication request that includes the acquired biometric information and a terminal function ID to the server apparatus 10. The task execution unit 303 sets "delivery service" as a terminal function ID.

The authentication unit 203 of the server apparatus 10 performs a matching processing using biometric information and determining processing whether or not a person to be authenticated is the hotel user, and obtains the result of authentication (authentication success or authentication failure).

When the biometric authentication is successful, the authentication unit 203 transmits a positive response that includes a home address and accommodation (hotel address and room number) of the person who has been successfully authenticated (hotel user) to the authentication terminal 20.

The task execution unit 303 of the authentication terminal 20 receives a response (positive response or negative response) to the authentication request and performs a processing in accordance with the result of authentication.

When the task execution unit 303 receives a negative response (the person to be authenticated is the non-hotel user), the task execution unit 303 displays a GUI that allows the user to select a delivery destination, for example, and acquires information about the delivery destination (address of the delivery destination, and so on).

Figure 15:
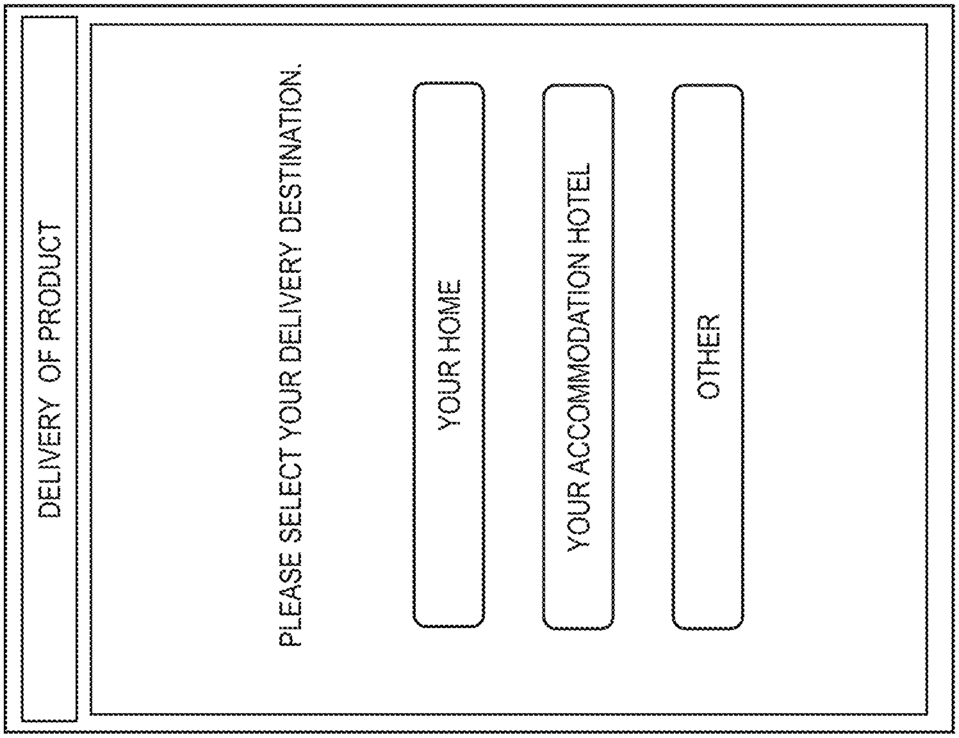
FIG. 15 is a diagram illustrating an example of a display of the authentication terminal according to the first example embodiment.

When the task execution unit 303 receives a positive response (the person to be authenticated is the hotel user), the task execution unit 303 displays a GUI that allows the user to select a delivery destination for the product (home, hotel, home or delivery destination other than the hotel) and acquires a wish of the hotel user (see FIG. 15).

In case the hotel user wishes to have the product delivered to his or her home, the task execution unit 303 creates a slip with the home address notified by the server apparatus 10 as the destination. In case the hotel user wishes to have the product delivered to the hotel, the task execution unit 303 creates a slip with the accommodation destination (hotel address and room number) notified by the server apparatus 10 as the destination.

The task execution unit 303 prints the created slip. A clerk at a retail store attaches the printed slip to the product and delivers the product to a shipping company, or the like.

Note that the authentication unit 203 may change the content of a reward provided to the hotel user based on reservation information of the person who has been successfully authenticated. For example, authentication unit 203 may make a shipping fee free or discount the shipping fee based on the reservation information of the hotel user. For example, the authentication unit 203 may set the shipping fee free with respect to the hotel user staying at the hotel for a long period of time, and may discount the shipping fee with respect to a user who has made a reservation at a restaurant. When the authentication unit 203 discounts the shipping fee, and so on, the authentication unit 203 notifies the authentication terminal 20 of a positive response that includes the discount rate for the shipping fee, and so on.

The task execution unit 303 of the authentication terminal 20 presents the content of the reward (free shipping or discounted shipping fee) notified by the server apparatus 10 to the hotel user and performs a processing in accordance with the content of the reward.

In this way, the server apparatus 10 provides the hotel user with a delivery service for a product purchased by the hotel user at an affiliated business operator as a reward. Since the hotel user does not need to input a delivery destination of the product into the authentication terminal 20, convenience for the hotel user is improved.

<Use of Resort Facility>

The following describes operations of the authentication system when a reward for "use of resort facility" is provided to the hotel user. Note that even if the content of the reward provided to the hotel user changes, there will be no change in the basic operation of the system, so a drawing corresponding to FIG. 11 will be omitted.

The authentication terminal 20 installed in a resort facility affiliated with a hotel acquires biometric information of a user in front of the authentication terminal 20. The task execution unit 303 of the authentication terminal 20 transmits an authentication request that includes the acquired biometric information and a terminal function ID to the server apparatus 10. Note that the task execution unit 303 sets "use of resort facility" to the terminal function ID.

The authentication unit 203 of the server apparatus 10 performs a matching processing using biometric information and determining processing to determine whether or not a person to be authenticated is the hotel user, and obtains the result of biometric authentication (authentication success or authentication failure). The authentication unit 203 transmits the result of authentication to the authentication terminal 20.

The task execution unit 303 of the authentication terminal 20 receives responses (positive response, negative response) to the authentication request and performs a processing in accordance with the results of authentication.

When the task execution unit 303 receives a negative response (the person to be authenticated is the non-hotel user), for example, the task execution unit 303 asks the person who has failed in authentication (the person to be authenticated who has been determined to have failed in biometric authentication) to present a ticket to use of a resort facility such as a lift.

Figure 16:
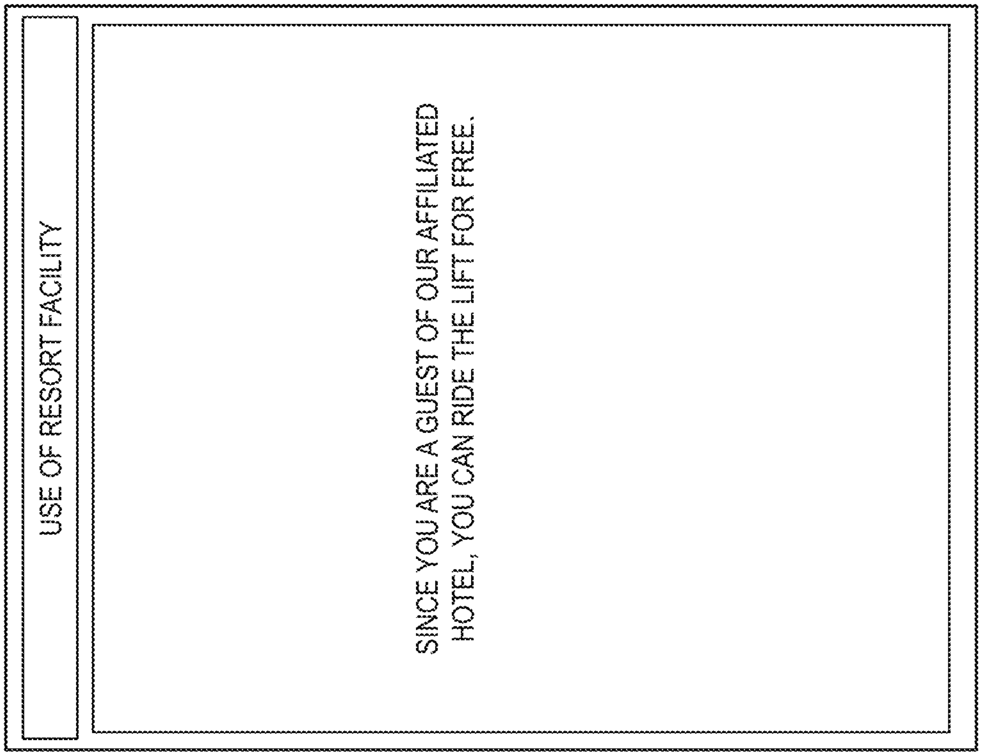
FIG. 16 is a diagram illustrating an example of a display of the authentication terminal according to the first example embodiment.

When the task execution unit 303 receives a positive response (the person to be authenticated is the hotel user), the task execution unit 303 displays a message as shown in FIG. 16, informing the hotel user that he or she can use the resort facility for free.

Note that the authentication unit 203 may change the content of a reward provided to the hotel user based on reservation information of the person who has been successfully authenticated. For example, the authentication unit 203 may offer free usage of resort facility or discount the usage fee of resort facility based on the reservation information of the hotel user. For example, authentication unit 203 may determine whether to permit or deny free use of the lift, or the like based on a period of stay of the user or a grade of a guest room.

Alternatively, the authentication unit 203 may discount the fee for use of the lift, or the like, in accordance with the reservation information of the user. For example, with respect to a user who has a short period of stay, the authentication unit 203 may discount the fee for the use of the lift for the user. Furthermore, with respect to a user who has a long period of stay, the authentication unit 203 permits the user to use the lift free of charge.

When the authentication unit 203 provides a discount on the usage fee, and so on, the authentication unit 203 notifies the authentication terminal 20 of a positive response that includes the discount rate for the usage fee, and so on.

The task execution unit 303 of the authentication terminal 20 presents the hotel user with the content of the reward notified by the server apparatus 10 (free usage of resort facility affiliated with the hotel or discounted usage fee for resort facility affiliated with the hotel), and performs a processing in accordance with the content of the reward.

In this way, the server apparatus 10 provides the hotel user with free use of the facility of the affiliated business operator as a reward. As a result, the hotel user finds the use of the hotel and resort facility attractive and repeatedly uses the hotel and resort facility. In addition, since the hotel user does not need to present a ticket or the like when using the resort facility, convenience for the hotel user is improved.

<Priority Use of Parking Lot>

The following describes the operation of the authentication system when a reward related to "priority use of a parking lot managed by an affiliated business operator" is provided to the hotel user. Note that even if the content of a reward provided to the hotel user changes, there is no change in the basic operation of the system, so a drawing corresponding to FIG. 11 will be omitted.

The authentication terminal 20 installed in the parking lot managed by an affiliated business operator acquires biometric information of a driver of a vehicle. For example, when the task execution unit 303 detects that the vehicle has stopped in front of a gate (detects using a sensor or the like), the task execution unit 303 instructs the biometric information acquisition unit 302 to acquire the biometric information of the driver.

Note that the camera device used by the authentication terminal 20 is installed so as to be able to photograph the driver of the vehicle. Depending on the situation of the parking lot, the main body of the authentication terminal 20 and the camera device are installed at different locations.

The task execution unit 303 transmits an authentication request that includes the acquired biometric information and a terminal function ID to the server apparatus 10. Note that the task execution unit 303 sets "priority use of parking lot" to the terminal function ID.

The authentication unit 203 of the server apparatus 10 performs a matching processing using the biometric information and determining processing whether or not the person to be authenticated is the hotel user, and obtains the result of authentication (authentication success or authentication failure). The authentication unit 203 transmits the result of authentication to the authentication terminal 20.

The task execution unit 303 of the authentication terminal 20 receives a response (positive or negative response) to the authentication request and performs a processing in accordance with the result of authentication.

Here, the task execution unit 303 of the authentication terminal 20 manages the number of vehicles that can be accommodated in the parking lot and the number of vehicles parked in the parking lot. In addition, parking spaces are reserved in the parking lot for priority use by the hotel user. For example, in case there are ten parking spaces in a parking lot, three parking spaces are reserved for the hotel users.

In other words, the number of parking spaces available to general users is calculated by subtracting the number of spaces reserved for the hotel users from the number of spaces that can be accommodated. In the above example, seven parking spaces are the parking spaces allocated to general users.

When there is a parking space available for general users, the task execution unit 303 permits a user to use the parking lot, regardless of the result of authentication from the server apparatus 10. For example, the authentication terminal 20 opens a gate and permits the vehicle to enter.

When there is no parking space available for general users and a negative response is received (when the user is the non-hotel user), the task execution unit 303 rejects the use of the parking lot by the user. For example, the task execution unit 303 notifies the driver that there is no parking space available.

When there is no parking space available for general users and a positive response is received (when the user is the hotel user), the task execution unit 303 determines whether there is a parking space available in the parking space reserved for the hotel user.

Figure 17:
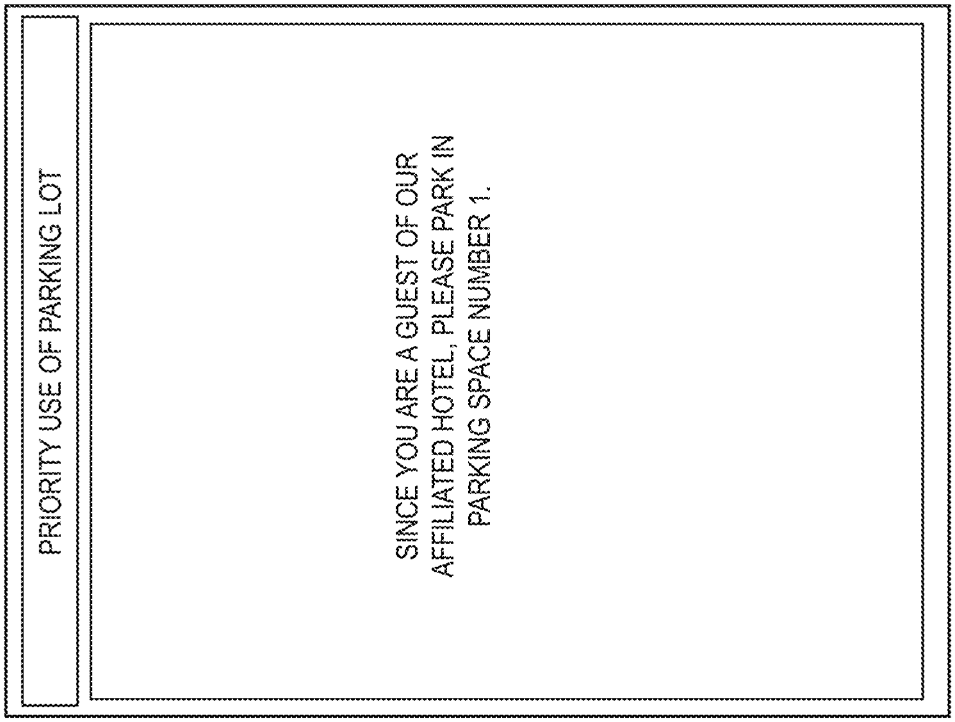
FIG. 17 is a diagram illustrating an example of a display of the authentication terminal according to the first example embodiment.

When there is a parking space available in the parking lot reserved for the hotel user, the task execution unit 303 permits the user to use the parking lot. For example, the task execution unit 303 selects one of the above three parking spaces that have been preferentially reserved and guides the driver to park in the selected parking space (see FIG. 17). When there is no parking space reserved for the hotel user available in the parking lot, the task execution unit 303 rejects the use of the parking lot by the user.

Note that the authentication unit 203 may change the content of a reward provided to the hotel user based on reservation information of the person who has been successfully authenticated. For example, the authentication unit 203 may make a parking fee free or provide a discount on the parking fee based on the reservation information of the hotel user.

For example, the authentication unit 203 may provide a reward to a user who has a short period of stay, such as a discount on the parking fee for that user, and may provide a reward to a user who has a long period of stay, such as allowing the user to use the parking lot free of charge. When the authentication unit 203 discounts the parking fee, and so on, the authentication unit 203 notifies the authentication terminal 20 of a positive response that includes the discount rate for the parking fee, and so on.

The task execution unit 303 of the authentication terminal 20 presents the content of the reward (free parking or discounted parking fee) notified by the server apparatus 10 to the hotel user and performs a processing in accordance with the content of the reward.

In this way, the server apparatus 10 provides the hotel user with a reward that allows the hotel user to use a parking lot managed by the affiliated business operator with priority. Since the hotel user does not have to worry about securing a parking lot, he or she can go out to a hotel and a facility around the hotel (affiliated business operator) in his or her own car and so on with peace of mind.

<Taxi Pick-Up>

The following describes the operation of the authentication system when a reward related to "taxi pick-up" is provided to the hotel user. Note that even if the content of a reward provided to the hotel user is changed, the operation of the basic system remains unchanged, so a drawing corresponding to FIG. 11 will be omitted.

The authentication terminal 20 installed at a taxi stand acquires biometric information of a user in front of the authentication terminal 20. The task execution unit 303 of the authentication terminal 20 transmits an authentication request that includes the acquired biometric information and a terminal function ID to the server apparatus 10. Note that the task execution unit 303 sets "taxi pick-up" to the terminal function ID.

The authentication unit 203 of the server apparatus 10 performs a matching processing using the biometric information and determining processing whether or not the person to be authenticated is the hotel user, and obtains the result of authentication (authentication success or authentication failure). The authentication unit 203 transmits the result of authentication to the authentication terminal 20.

The task execution unit 303 of the authentication terminal 20 receives a response (positive response or negative response) to the authentication request and performs a processing in accordance with the result of authentication.

When the task execution unit 303 receives a negative response (the person to be authenticated is the non-hotel user), the task execution unit 303 displays contact information (for example, telephone number), and the like, of the taxi company.

Figure 18:
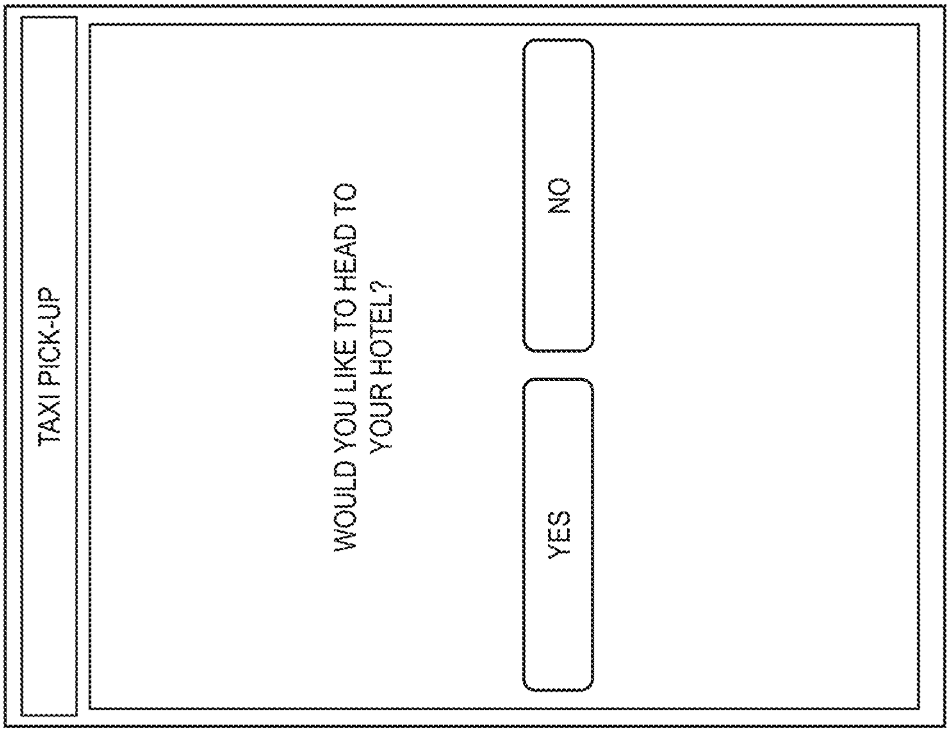
FIG. 18 is a diagram illustrating an example of a display of the authentication terminal according to the first example embodiment.

When the task execution unit 303 receives a positive response (the person to be authenticated is the hotel user), the task execution unit 303 displays a GUI (Graphical User Interface) that inquires whether the person who has been successfully authenticated is heading to a hotel or not (see FIG. 18).

When the hotel user wishes to head to the hotel, the task execution unit 303 sets the destination to the hotel where the user is staying and arranges for a taxi to pick up the user. Specifically, the task execution unit 303 instructs a taxi company to pick up the user.

Note that the authentication unit 203 may change the content of a reward provided to the hotel user based on reservation information of the person who has been successfully authenticated. For example, the authentication unit 203 may make a taxi fare free or provide a discount on the taxi fare based on reservation information of the hotel user. For example, the authentication unit 203 may provide a reward such as a discount on the fare to a user who has a short period of stay, and a reward such as a free fare to a user who has a long period of stay. When the authentication unit 203 discounts the fare, and so on, the authentication unit 203 notifies the authentication terminal 20 of a positive response that includes the discount rate for the fare, and so on.

The task execution unit 303 of the authentication terminal 20 presents the content of the reward (free taxi fare, discounted fare) notified by the server apparatus 10 to the hotel user and performs a processing in accordance with the content of the reward.

In this way, the server apparatus 10 provides the hotel user with a taxi pick-up to the hotel where the hotel user is staying as a reward. Since the hotel user can use a taxi without having to inform a taxi company of the address, and so on, of the hotel where the hotel user is staying, convenience for the hotel user is improved.

As described above, in the authentication system according to the first example embodiment, the server apparatus 10 identifies a hotel user who has visited an affiliated business operator of a hotel by biometric authentication. The server apparatus 10 provides to the hotel user a reward related to the affiliated business operator. By providing the hotel user with the reward, the hotel user (tourist) is motivated to use the hotel and to engage in consumption behavior at the affiliated business operator in the vicinity. In other words, attractiveness of the hotel and the affiliated business operator in the vicinity of the hotel will increase, and more users (tourists) will use the hotel and the affiliated business operator. As a result, the economy of the hotel and the area around the hotel will be revitalized.

Figure 19:
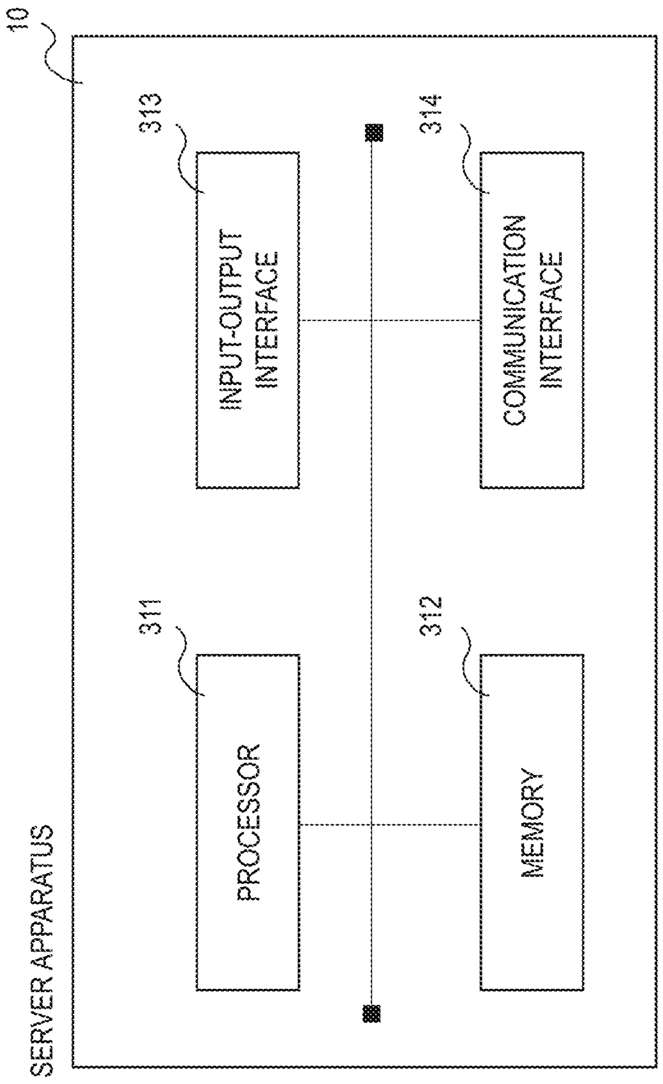
FIG. 19 is a diagram illustrating an example of a hardware configuration of the server apparatus of the present application.

Next, a hardware configuration of an individual apparatus that constitutes the authentication system will be described. FIG. 19 is a diagram illustrating an example of a hardware configuration of the server apparatus 10.

The server apparatus 10 can be configured by an information processing apparatus (a so-called computer) and includes a configuration illustrated as an example in FIG. 19. For example, the server apparatus 10 includes a processor 311, a memory 312, an input-output interface 313, a communication interface 314, etc. The components such as the processor 211 are connected to an internal bus, etc. so that these components can communicate with each other.

The hardware configuration of the server apparatus 10 is not limited to the configuration illustrated in FIG. 19. The server apparatus 10 may include hardware not illustrated or may be configured without the input-output interface 313 if desired. In addition, the number of components, such as the number of processors 311, included in the server apparatus 10 is not limited to the example illustrated in FIG. 19. For example, a plurality of processors 311 may be included in the server apparatus 10.

For example, the processor 311 is a programmable device such as a CPU (Central Processing Unit), an MPU (Micro Processing Unit), or a DSP (Digital Signal Processor). Alternatively, the processor 311 may be a device such as an FPGA (Field Programmable Gate Array) or an ASIC (Application Specific Integrated Circuit). The processor 311 executes various kinds of programs including an operating system (OS).

The memory 312 is a RAM (Random Access Memory), a ROM (Read-Only Memory), an HDD (Hard Disk Drive), an SSD (Solid State Drive), or the like. The memory 312 stores an OS program, an application program, and various kinds of data.

The input-output interface 313 is an interface for a display device and an input device not illustrated. For example, the display device is a liquid crystal display or the like. For example, the input device is a device, such as a keyboard or a mouse, which receives user operations.

The communication interface 314 is a circuit, a module, or the like for performing communication with other apparatuses. For example, the communication interface 314 includes a NIC (Network Interface Card) or the like.

The function of the server apparatus 10 is realized by various kinds of processing modules. The processing modules are realized, for example, by causing the processor 311 to execute a program stored in the memory 312. In addition, this program can be recorded in a computer-readable storage medium. The storage medium may be a non-transient (non-transitory) storage medium, such as a semiconductor memory, a hard disk, a magnetic recording medium, or an optical recording medium. That is, the present invention can be embodied as a computer program product. In addition, the above program may be updated by downloading a program via a network or by using a storage medium in which a program is stored. In addition, the above processing modules may be realized by semiconductor chips.

As is the case with the server apparatus 10, the authentication terminal 20 can each be configured by an information processing apparatus, and the basic hardware configuration of the authentication terminal 20 is the same as that of the server apparatus 10. Thus, description of the basic hardware configuration of the authentication terminal 20 will be omitted. For example, the authentication terminal 20 may include a camera device for photographing a person to be authenticated.

The server apparatus 10 which is an information processing device includes a computer and can realize its functions by causing the computer to execute a program. In addition, the server apparatus 10 executes a control method of the server apparatus 10 by using this program.

[Variations]

The configurations, operations, etc. of the authentication systems according to the above example embodiments are examples and do not limit the present system configuration, etc.

The above example embodiment describes that biometric information of a user is registered in the server apparatus 10 when the user makes a reservation at a hotel. However, registration of biometric information is not limited to the time of making a reservation, for example, biometric information may be registered from a kiosk terminal or the like installed at an airport or the like in close proximity to the hotel.

It goes without saying that the reward provided to the hotel user described in the above example embodiment is an example and other rewards may be provided. For example, the server apparatus 10 may provide the hotel user with information on use of a facility around a hotel. For example, a user visits a restaurant to have lunch. The user operates the authentication terminal 20 (tablet) to select a menu item. At that time, the authentication terminal 20 acquires biometric information of the user (face image) and transmits the biometric information to the server apparatus 10. The server apparatus 10 identifies the person to be authenticated by biometric authentication and identifies the course of dishes that the person to be authenticated has made a reservation for (the course of dishes reserved via the hotel). The server apparatus 10 may recommend a lunch menu based on the identified course of dishes. For example, when a course of meat dishes is reserved for dinner, the server apparatus 10 recommends a menu of fish dishes.

Alternatively, the server apparatus 10 may determine the content to recommend in accordance with attributes of related persons (for example, family, friend, and acquaintances) of the person to be authenticated (the hotel user) identified by biometric authentication and the number of members in a group that includes the person to be authenticated. For example, the server apparatus 10 may recommend Chinese cuisine for a larger group and Japanese cuisine for a smaller group. Here, since the hotel needs to be aware of the number of dishes to be provided to the group of guests and the number of beds to be prepared, information on the composition of the group (for example, family composition) is input to the server apparatus 10 at the time of check-in. The server apparatus 10 can acquire information such as the attributes and number of members composing the group using the input information, and may utilize the information for providing a reward.

The server apparatus 10 may change a reward provided or change the content of information provided based on a behavior history of a user, instead of or in addition to reservation information of the hotel user. For example, when a user pays for a meal at a restaurant by face recognition payment, the authentication terminal 20 transmits the meal menu of the user to the server apparatus 10. The server apparatus 10 accumulates the acquired menu and manages the accumulated acquired menu as the behavior history of the user (hotel user). The server apparatus 10 periodically or at a predetermined timing checks the behavior history and provides information to the user. For example, the server apparatus 10 makes a recommendation regarding a light meal menu to a user who had lunch at a restaurant during a snack time (for example, around 3:00 p.m.) and makes a recommendation regarding a dinner menu in the evening. For example, for a user who had pasta for lunch, the server apparatus 10 suggests gelato as a “snack” and suggests “Japanese cuisine” for dinner, and so on. At that time, the server apparatus 10 may recommend a restaurant that is close to the user based on location information of the user. Alternatively, the server apparatus 10 may determine a store to suggest by referring to evaluations of other company (results of reviews on an evaluation site). Alternatively, the server apparatus 10 may provide information (recommend) based on the amount of money that the user plans to spend.

Figure 20:
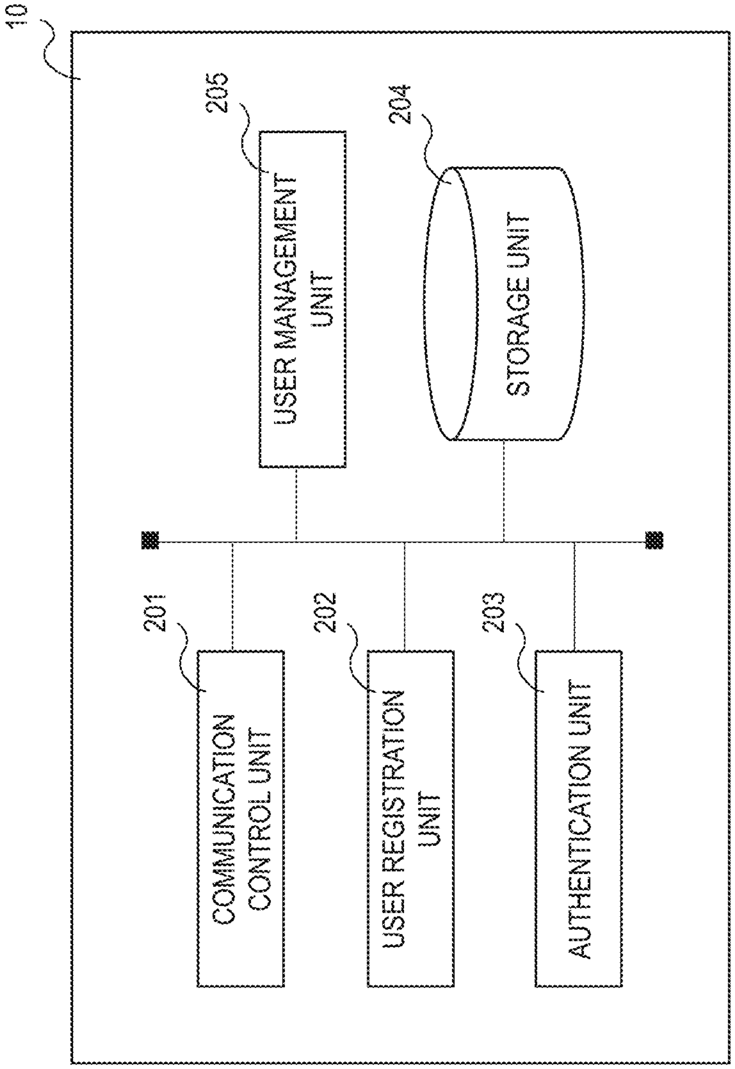
FIG. 20 is a diagram illustrating an example of a processing configuration of the server apparatus for a variation of the present application.

The above example embodiment describes that the server apparatus 10 treats a user during the stay period, which includes the day of check-in and the day of check-out, as the hotel user. However, the server apparatus 10 may treat a user who has completed check-in as the hotel user and a user who has completed check-out as the non-hotel user. In this case, the server apparatus 10 includes a user management unit 205 as shown in FIG. 20. The user management unit 205 manages the user who has completed the check-in procedure and the check-out procedure using the user information database. For example, the user management unit 205 manages the status of the user using a flag. The authentication unit 203 may refer to the flag in the user information database and determine whether the user is the hotel user or not in accordance with the status of the user.

Alternatively, the server apparatus 10 may treat a user as the hotel user several days before the start date of stay (check-in date) or may treat a user as the hotel user several days after the end date of stay (check-out date). In this case, the user management unit 205 may periodically or at predetermined timing refer to the user information database, determine the period during which each user is treated as the hotel user (the date and time to start treating a user as the hotel user and the date and time to end treating a user as the hotel user), and reflect this information in the user information database. The authentication unit 203 may refer to the period reflected in the user information database and determine whether or not a person to be authenticated identified by a matching processing is the hotel user.

The server apparatus 10 may determine the period during which a user is treated as the above hotel user in accordance with reservation information (period of stay, grade of guest room, and so on) of the user. For example, the server apparatus 10 may determine the above period (the period during which a user is treated as the hotel user) so as to give preferential treatment to a user who stays for a long period of time or stays in a higher grade guest room.

The server apparatus 10 may distinguish and manage users who have already checked in (checked-in users), users who are scheduled to check in on the start date of the stay (scheduled check-in users), and users who have completed check-out on the end date of the stay (completed check-out users). Furthermore, the server apparatus 10 may provide the same rewards (services) to each user (checked-in users, scheduled check-in users, and checked-out users), or the server apparatus 10 may provide different rewards. For example, the server apparatus 10 may provide a reward to give preferential treatment to a user who has already checked in (a guest) over a user who is scheduled to check in and a user who has already checked out.

The above example embodiment describes a case in which the server apparatus 10 identifies the function of the authentication terminal 20 using a terminal function ID. However, the server apparatus 10 may also identify the function of the authentication terminal 20 based on a terminal ID (for example, a Media Access Control (MAC) address) of each authentication terminal 20.

Furthermore, each authentication terminal 20 may include a plurality of functions. For example, the authentication terminal 20 installed in a retail store may include a function related to payment and a function related to delivery of a product. In this case, the authentication terminal 20 may transmit an authentication request to the server apparatus 10 using different terminal function IDs corresponding to the required functions. For example, when the authentication terminal 20 provides the delivery service after discounting on price, the authentication terminal 20 may first transmit an authentication request that includes "TF01 (discount on price)", and then transmit an authentication request that includes "TF02 (delivery service)" to the server apparatus 10. Moreover, in this case, the authentication terminal 20 may not have to transmit biometric information (face image) when the authentication terminal 20 transmits the second authentication request.

The above example embodiment describes a reward provided for the use of a resort facility. Here, the server apparatus 10 may acquire information regarding the use of the resort facility (lift, or the like) when the hotel user makes a reservation. The server apparatus 10 may sell a ticket for use of the lift, or the like, and set an authentication regarding the user who has purchased the ticket (authentication regarding the use of the lift) to be successfully authenticated. Alternatively, the server apparatus 10 may sell a lift ticket at the resort facility, as well as at an amusement park, theme park, or the like. The server apparatus 10 may identify a user using face recognition when the server apparatus 10 sells the lift ticket. At that time, when the identified user is the hotel user (for example, a user who is scheduled to check-in on the same day or a user who has completed check-out), the server apparatus 10 may provide a reward such as making the price of the ticket free or discounting the price of the ticket for the hotel user. Note that when the user is not the hotel user, the ticket will be sold at the regular price.

An accommodation ticket with a ticket that grants a right to use of a resort facility may be sold. The server apparatus 10 may determine whether a user is a purchaser of the accommodation ticket with the ticket by biometric authentication, and provide the purchaser with a reward different from a reward provided to other hotel user. For example, server apparatus 10 may provide the reward, such as a large discount on accommodation fee, to the purchaser of the accommodation ticket with the ticket. Alternatively, the server apparatus 10 may also provide free use of the resort facility of a different type than the purchased ticket as the reward. For example, the server apparatus 10 may provide a reward to a purchaser of the accommodation ticket with the ticket for use of a lift at a ski resort with free use of a gondola located at the same ski resort.

The above example embodiment describes that a delivery service of a product purchased by a user is provided to the hotel user as a reward. However, the delivery service is not limited to a purchased product. For example, the delivery service may be applicable to equipment or the like used at a resort facility (ski resort, golf course, and so on). That is, a golf set may be delivered from the golf course to home of the hotel user, or a ski set may be delivered from the ski resort to home of the hotel user. Alternatively, a user who has participated in a wedding ceremony held at a hotel may have his or her belongings related to the wedding ceremony delivered to his or her home.

The above example embodiment describes that biometric authentication is performed using the biometric information of the driver when describing a reward related to priority use of a parking lot. However, the authentication terminal 20 may set not only the driver, but also a person sitting in a passenger seat or a rear seat as a target of biometric authentication, and transmit biometric information of the person to the server apparatus 10.

Alternatively, the authentication terminal 20 may determine whether a user who is about to use a parking lot is the hotel user or not by authentication using a vehicle number registered at the time of making a reservation for a hotel, instead of authentication using the biometric information of the user.

The above example embodiment describes that a reward for a taxi pick-up is provided by the authentication terminal 20 installed at a taxi stand. However, the reward may also be provided inside the taxi. That is, since biometric information is already registered when a user makes a hotel reservation, when the user goes a hotel from a station or airport, or the like, the biometric information of the user may be transmitted to the server apparatus 10 from inside the taxi, and the hotel where the hotel user is staying may be identified by biometric authentication. In this way, an authentication request may be transmitted not only from the authentication terminal 20 installed at the taxi stand at the station or airport, but also from the authentication terminal 20 (for example, a tablet) inside the taxi, and the destination and payment information of the user may be shared between the hotel and the taxi.

The above example embodiment describes that a person to be authenticated is identified using biometric authentication. However, identification of the person to be authenticated may be performed by other means. For example, the identification of the person to be authenticated may be performed using a two-dimensional code into which a terminal ID is converted. That is, instead of biometric information (face image), a user may register the two-dimensional code generated from the terminal ID, and so on, in the server apparatus 10, and have the authentication terminal 20 read the terminal ID. The authentication terminal 20 may transmit the acquired terminal ID (two-dimensional code) to the server apparatus 10. Furthermore, when it is necessary to identify the hotel user in a hotel, biometric authentication using biometric information may be used. In other words, biometric authentication may be used when a reward (service) is used in the hotel.

The above example embodiment describes a case in which a user information database is configured inside the server apparatus 10, but the database may be established in an external database server or the like. That is, some of the functions of the server apparatus 10 may be implemented in another server. More specifically, the "user registration unit (user registration means)", "authentication unit (authentication means)", and so on described above may be implemented in any device included in that includes the system.

The data exchange mode between the server apparatus 10 and the authentication terminal 20 is not limited to a particular mode. The data exchanged between these apparatuses may be encrypted. Biometric information of a user and so on is exchanged between these apparatuses, and to appropriately protect the personal information, it is desirable that encrypted data be exchanged.

In the flowcharts and sequence diagrams used in the above description, a plurality of steps (processes) are sequentially described. However, the order of the execution of the steps performed in the individual example embodiment is not limited to the described order. In the individual example embodiment, the order of the illustrated steps may be changed to the extent that a problem is not caused on the content of the individual example embodiment. For example, individual processes may be executed in parallel.

The above example embodiments have been described in detail to facilitate the understanding of the present application disclosed and not to mean that all the configurations described above are needed. In addition, if a plurality of example embodiments have been described, each of the example embodiments may be used individually or a plurality of example embodiments may be used in combination. For example, part of a configuration according to one example embodiment may be replaced by a configuration according to another example embodiment. For example, a configuration according to one example embodiment may be added to a configuration according to another example embodiment. In addition, addition, deletion, or replacement is possible between part of a configuration according to one example embodiment and another configuration.

The industrial applicability of the present invention has been made apparent by the above description. That is, the present invention is suitably applicable, for example, to authentication systems and the like that authenticate users who visit affiliated business operators.

A part or the entirety of the example embodiments described above may be described as in the following supplementary notes, but is not limited to the followings.

[Supplementary Note 1]

A system including:

a server apparatus that stores biometric information of at least one or more users who plan to use a hotel; and an authentication terminal that is managed by an affiliated business operator that has a partnership relationship with the hotel, and transmits an authentication request including biometric information of a person to be authenticated to the server apparatus, wherein the server apparatus identifies the person to be authenticated among the at least one or more users by a matching processing using the biometric information included in the authentication request and the stored biometric information, and provides a hotel user with a reward related to the affiliated business operator when the identified person to be authenticated is the hotel user who will use the hotel after a predetermined time based on a time of processing the authentication request or who used the hotel before a predetermined time based on the time of processing the authentication request.

[Supplementary Note 2]

The system according to supplementary note 1, wherein the server apparatus changes the reward provided to the hotel user in accordance with a function of the authentication terminal.

[Supplementary Note 3]

The system according to supplementary note 2, wherein the authentication terminal transmits to the server apparatus the authentication request including a terminal function ID for identifying a function assigned to the authentication terminal and biometric information of the person to be authenticated, and wherein the server apparatus identifies the function of the authentication terminal based on the terminal function ID and provides the reward to the hotel user in accordance with the identified function.

[Supplementary Note 4]

The system according to any one of supplementary notes 1 to 3, wherein the server apparatus stores the biometric information of the at least one or more users and reservation information regarding a reservation of the hotel, and determine the reward provided to the hotel user based on the reservation information of the identified person to be authenticated.

[Supplementary Note 5]

The system according to any one of supplementary notes 1 to 4, wherein the hotel user a guest of the hotel or a user of a facility of the hotel.

[Supplementary Note 6]

The system according to any one of supplementary notes 1 to 5, wherein the server apparatus provides the hotel user with a discount on price to be paid by the hotel user to the affiliated business operator as the reward.

[Supplementary Note 7]

The system according to any one of supplementary notes 1 to 6, wherein the server apparatus provides the hotel user with a delivery service for a product purchased by the hotel user at the affiliated business operator as the reward.

[Supplementary Note 8]

The system according to any one of supplementary notes 1 to 7, wherein the server apparatus provides the hotel user with free use of a facility of the affiliated business operator as the reward.

[Supplementary Note 9]

The system according to any one of supplementary notes 1 to 8, wherein the server apparatus provides the hotel user with the reward that allows the hotel user to use a parking lot managed by the affiliated business operator with priority.

[Supplementary Note 10]

The system according to any one of supplementary notes 1 to 8, wherein the server apparatus provides the hotel user with the reward of a taxi pick-up whose destination is the hotel.

[Supplementary Note 11]

The system according to any one of supplementary notes 1 to 10, wherein the biometric information is a face image or a feature value generated from the face image.

[Supplementary Note 12]

A server apparatus including:

a storage unit that stores biometric information of at least one or more users who plan to use a hotel;

a receiving unit that receives an authentication request including biometric information of a person to be authenticated from an authentication terminal that is managed by an affiliated business operator that has a partnership relationship with the hotel; and an authentication unit that identifies the person to be authenticated among the at least one or more users by a matching processing using the biometric information included in the authentication request and the stored biometric information, and provides a hotel user with a reward related to the affiliated business operator when the identified person to be authenticated is the hotel user who will use the hotel after a predetermined time based on the time of processing the authentication request or who used the hotel before a predetermined time based on the time of processing the authentication request.

[Supplementary Note 13]

A control method of a server apparatus that stores biometric information of at least one or more users who plan to use a hotel, the control method including:

receiving an authentication request including biometric information of a person to be authenticated from an authentication terminal that is managed by an affiliated business operator that has a partnership relationship with the hotel;

identifying the person to be authenticated among the at least one or more users by a matching processing using the biometric information included in the authentication request and the stored biometric information; and providing a hotel user with a reward related to the affiliated business operator when the identified person to be authenticated is the hotel user who will use the hotel after a predetermined time based on the time of processing the authentication request or who used the hotel before a predetermined time based on the time of processing the authentication request.

[Supplementary Note 14]

A computer-readable storage medium storing a program causing a computer mounted on a server apparatus that stores biometric information of at least one or more users who plan to use a hotel to perform processing for:

receiving an authentication request including biometric information of a person to be authenticated from an authentication terminal that is managed by an affiliated business operator that has a partnership relationship with the hotel;

identifying the person to be authenticated among the at least one or more users by a matching processing using the biometric information included in the authentication request and the stored biometric information; and providing a hotel user with a reward related to the affiliated business operator when the identified person to be authenticated is the hotel user who will use the hotel after a predetermined time based on the time of processing the authentication request or who used the hotel before a predetermined time based on the time of processing the authentication request.

The entire disclosure of the above patent literature is incorporated herein by reference thereto. While the example embodiments of the present invention have thus been described, the present invention is not limited to these example embodiments. It is to be understood to those skilled in the art that these example embodiments are only examples and that various variations are possible without departing from the scope and sprit of the present invention. That is, the present invention of course includes various variations and modifications that could be made by those skilled in the art in accordance with the overall disclosure including the claims and the technical concept.

REFERENCE SIGNS LIST

10 server apparatus
20 authentication terminal
30 terminal
101 server apparatus
102 authentication terminal
201 communication control unit
202 user registration unit
203 authentication unit
204 storage unit
205 user management unit
301 communication control unit
302 biometric information acquisition unit
303 task execution unit
304 storage unit
311 processor
312 memory
313 input-output interface
314 communication interface

What is claimed is:

1. A system comprising:

a server apparatus that stores biometric information of at least one or more users who plan to use a hotel; and an authentication terminal that is managed by an affiliated business operator that has a partnership relationship with the hotel, and transmits a request including biometric information of a person to be authenticated to the server apparatus, wherein the server apparatus;

identifies the person to be authenticated among the at least one or more users by a matching processing using the biometric information included in the request and the stored biometric information; and provides a hotel user with a reward related to the affiliated business operator when the identified person to be authenticated is the hotel user who will use the hotel after a predetermined time of the request or who used the hotel before a predetermined time of the request.

2. The system according to claim 1, wherein the server apparatus changes the reward provided to the hotel user in accordance with a function of the authentication terminal.

3. The system according to claim 2, wherein the authentication terminal transmits to the server apparatus the authentication request including a terminal function ID for identifying a function assigned to the authentication terminal and biometric information of the person to be authenticated, and wherein the server apparatus identifies the function of the authentication terminal based on the terminal function ID and provides the reward to the hotel user in accordance with the identified function.

4. The system according to claim 1, wherein the server apparatus stores the biometric information of the at least one or more users and reservation information regarding a reservation of the hotel, and determine the reward provided to the identified person to be authenticated based on the reservation information of the identified person to be authenticated.

5. The system according to claim 1, wherein the hotel user is a guest of the hotel or a user of a facility of the hotel.

6. The system according to claim 1, wherein the server apparatus provides the hotel user with a discount on price to be paid by the hotel user to the affiliated business operator as the reward.

7. The system according to claim 1, wherein the server apparatus provides the hotel user with a delivery service for a product purchased by the hotel user at the affiliated business operator as the reward.

8. The system according to claim 1, wherein the server apparatus provides the hotel user with free use of a facility of the affiliated business operator as the reward.

9. The system according to claim 1, wherein the server apparatus provides the hotel user with the reward that allows the hotel user to use a parking lot managed by the affiliated business operator with priority.

10. The system according to claim 1, wherein the server apparatus provides the hotel user with the reward of a taxi pick-up whose destination is the hotel.

11. The system according to claim 1, wherein the biometric information is a face image or a feature value generated from the face image.

12. The system according to claim 1, wherein the server apparatus provides different rewards based on whether the hotel user is a checked-in user who has already checked in, a scheduled check-in user who is scheduled to check in, or a checked-out user who has completed check-out.

13. The system according to claim 1, wherein the server apparatus determines a period during which the hotel user is eligible for the reward in accordance with reservation information of the hotel user, and provides the reward to the hotel user within the determined period.

14. A server apparatus comprising:

at least one memory storing a set of instructions; and at least one processor configured to execute the set of instructions to:

store biometric information of at least one or more first users who plan to use a hotel;

receive a request including biometric information of a person to be authenticated from an authentication terminal that is managed by an affiliated business operator that has a partnership relationship with the hotel; and identify the person to be authenticated among the at least one or more users by a matching processing using the biometric information included in the authentication request and the stored biometric information, and provide a hotel user with a reward related to the affiliated business operator when the identified person to be authenticated is the hotel user who will use the hotel after a predetermined time of the request or who used the hotel before a predetermined time of the request.

15. A control method of a server apparatus that stores biometric information of at least one or more users who plan to use a hotel, the control method comprising:

receiving an authentication request including biometric information of a person to be authenticated from an authentication terminal that is managed by an affiliated business operator that has a partnership relationship with the hotel;

identifying the person to be authenticated among the at least one or more first and second users by a matching processing using the biometric information included in the authentication request and stored biometric information; and providing a hotel user with a reward related to the affiliated business operator when the identified person to be authenticated is the hotel user who will use the hotel after a predetermined time of the request or who used the hotel before a predetermined time of the request.

16. The server apparatus according to claim 14, wherein the at least one processor is further configured to execute the set of instructions to provide different rewards based on whether the hotel user is a checked-in user who has already checked in, a scheduled check-in user who is scheduled to check in, or a checked-out user who has completed check-out.

17. The server apparatus according to claim 14, wherein the at least one processor is further configured to execute the set of instructions to determine a period during which the hotel user is eligible for the reward in accordance with reservation information of the hotel user, and provide the reward to the hotel user within the determined period.

18. The control method according to claim 15, wherein providing the hotel user with the reward comprises providing different rewards based on whether the hotel user is a checked-in user who has already checked in, a scheduled check-in user who is scheduled to check in, or a checked-out user who has completed check-out.

19. The control method according to claim 15, further comprising determining a period during which the hotel user is eligible for the reward in accordance with reservation information of the hotel user, wherein the reward is provided to the hotel user within the determined period.

* * * * *